(12) United States Patent
Furman et al.

(10) Patent No.: US 11,110,418 B2
(45) Date of Patent: Sep. 7, 2021

(54) INTERNAL SHIELD SYSTEM FOR FLUIDS AND SOLIDS PROCESSING DEVICES AND USES THEREOF

(71) Applicants: Ehud Furman, Nesher (IL); Tzvi Furman, Kfar Vradim (IL)

(72) Inventors: Ehud Furman, Nesher (IL); Tzvi Furman, Kfar Vradim (IL)

(73) Assignee: KIINNS FOODTECH LTD., Kfar Vradim (IL)

(*) Notice: Subject to any disclaimer, the term of this patent is extended or adjusted under 35 U.S.C. 154(b) by 258 days.

(21) Appl. No.: 16/067,638

(22) PCT Filed: Jan. 16, 2017

(86) PCT No.: PCT/IL2017/050051
§ 371 (c)(1),
(2) Date: Jul. 2, 2018

(87) PCT Pub. No.: WO2017/125913
PCT Pub. Date: Jul. 27, 2017

(65) Prior Publication Data
US 2019/0009233 A1 Jan. 10, 2019

Related U.S. Application Data

(60) Provisional application No. 62/280,142, filed on Jan. 19, 2016, provisional application No. 62/305,550, (Continued)

(51) Int. Cl.
*B01F 15/00* (2006.01)
*A47J 43/046* (2006.01)
(Continued)

(52) U.S. Cl.
CPC .......... *B01F 15/00837* (2013.01); *A21C 1/02* (2013.01); *A21C 1/149* (2013.01);
(Continued)

(58) Field of Classification Search
CPC ........ A21C 1/02; A21C 1/149; A47J 43/0465; A47J 43/07; A47J 43/0727;
(Continued)

(56) References Cited

U.S. PATENT DOCUMENTS 2,364,012 A * 11/1944 Walton ...................... B65D 5/60
229/117.28
3,468,451 A * 9/1969 Coleman ................ B65D 77/06
220/495.11
(Continued)

FOREIGN PATENT DOCUMENTS

| CN | 101108330 A | 1/2008 |
|---|---|---|
| DE | 8807196 U1 | 2/1989 |
| DE | 3818721 A1 | 12/1989 |

OTHER PUBLICATIONS

Chinese patent office's office action for Chinese application No. 1201780007184.6; dated Apr. 3, 2019; 9 pages; and English translation—12 pages.
(Continued)

*Primary Examiner* — Charles S Bushey
(74) *Attorney, Agent, or Firm* — Roach Brown McCarthy & Gruber; Kevin D. McCarthy

(57) ABSTRACT

A device for the processing of liquids and/or solids includes a disposable layer adapted to shield a working surface from coming into contact with, and being fouled by, the processed liquids and/or solids, and apparatus suitable to apply a negative pressure in a gap between the disposable layer and the working surface, thereby causing the disposable layer to adhere to the working surface.

18 Claims, 21 Drawing Sheets

Related U.S. Application Data filed on Mar. 9, 2016, provisional application No. 62/333,283, filed on May 9, 2016.

(51) Int. Cl.

| | |
|---|---|
| *A47J 43/07* | (2006.01) |
| *B01F 7/16* | (2006.01) |
| *B01F 13/08* | (2006.01) |
| *A21C 1/02* | (2006.01) |
| *A21C 1/14* | (2006.01) |
| *B01F 3/04* | (2006.01) |
| *A47J 43/044* | (2006.01) |

(52) U.S. Cl.
CPC ........... *A47J 43/0465* (2013.01); *A47J 43/07* (2013.01); *A47J 43/0727* (2013.01); *B01F 3/04453* (2013.01); *B01F 7/162* (2013.01); *B01F 7/1615* (2013.01); *B01F 13/0872* (2013.01); *A47J 2043/04454* (2013.01); *B01F 2215/0006* (2013.01); *B01F 2215/0011* (2013.01); *B01F 2215/0014* (2013.01)

(58) Field of Classification Search
CPC ........ A47J 2043/04454; B01F 3/04453; B01F 7/1615; B01F 7/162; B01F 13/0872; B01F 15/00837; B01F 2215/0006; B01F 2215/0011; B01F 2215/0014
USPC .................................... 261/84, 91, 93, 119.1
See application file for complete search history.

(56) References Cited

U.S. PATENT DOCUMENTS

| | | | | |
|---|---|---|---|---|
| 3,794,203 | A * | 2/1974 | Baumann | B29C 51/12 |
| | | | | 220/4.14 |
| 3,940,052 | A * | 2/1976 | McHugh | B65D 25/16 |
| | | | | 383/121.1 |
| 4,347,948 | A * | 9/1982 | Hamada | B65D 25/14 |
| | | | | 220/378 |
| 4,516,906 | A | 5/1985 | Krein | |
| 4,711,582 | A * | 12/1987 | Kennedy | B01F 15/00837 |
| | | | | 366/189 |
| 4,863,339 | A | 9/1989 | Krein | |
| 5,059,084 | A | 10/1991 | Krein | |
| 6,494,613 | B2 * | 12/2002 | Terentiev | B01F 7/0005 |
| | | | | 366/279 |
| 7,384,027 | B2 * | 6/2008 | Terentiev | B01F 3/04248 |
| | | | | 261/93 |
| 8,746,964 | B2 * | 6/2014 | Castillo | B01F 3/1221 |
| | | | | 366/273 |
| 10,456,761 | B2 * | 10/2019 | Chaussin | B01F 3/04248 |
| 2007/0253287 | A1 | 11/2007 | Myhrberg | |
| 2009/0188211 | A1 * | 7/2009 | Galliher | B01F 15/0085 |
| | | | | 53/434 |
| 2012/0118885 | A1 | 5/2012 | Terentiev et al. | |
| 2013/0228575 | A1 | 9/2013 | Helou et al. | |

OTHER PUBLICATIONS

Communication pursuant to Rule 164(a) EPC and Supplementary Partial European Search Report for EP 17 74 1175, dated Sep. 13, 2019; 11 pages.
International Search Report for PCT/IL2017/050051, dated Apr. 24, 2017; 4 pages.
Written Opinion of the International Searching Authority for PCT/IL2017/050051, dated Apr. 24, 2017; 6 pages.
International Preliminary Report on Patentability for PCT/IL2017/050051, dated May 15, 2018; 59 pages.

* cited by examiner

INTERNAL SHIELD SYSTEM FOR FLUIDS AND SOLIDS PROCESSING DEVICES AND USES THEREOF

FIELD OF THE INVENTION

The present invention relates to the processing of liquids and solids. More particularly, the present invention relates to methods and devices for the efficient processing of liquid and solids.

BACKGROUND OF THE INVENTION

Liquid and solid processing devices are used in a variety of unit operations, including heating, mixing, blending, frothing of solid and liquid materials, as well as chopping of solids, slurrying, etc. Examples of processing devices include, among others, laboratory and industrial processing equipment and food and beverage processing devices such as: food processors, blenders, dough kneading machines, mixers, milk frothers, pots and pans. Such devices normally comprise a container for retaining the food or beverage materials during processing. Sometimes the container comprises a lid that prevents spillage of the food or beverage material during processing. Furthermore, the container may comprise a moving element. For example, containers of food processors and blenders comprise a cutting blade that mixes food or beverage material, or grinds solids as it turns. Another example is milk frothers that use a whisk to foam milk as it turns. The moving element is either mechanically or magnetically coupled to an actuating element, such as an electric motor. In some cases, the moving element is permanently attached to the actuating element of the device, and in other cases it is removable. In yet some other cases the moving element is attached to the bottom of the container. For example, in milk frothers the whisk is located at the bottom of the milk container. In other cases the moving element is attached to an actuating element located above the container, like for example in dough kneading machines in which a kneading head is actuated by a motor located above the dough container.

Processing devices used in laboratory work for processing chemicals, medicine or other materials are used, for example, for mixing, blending, melting, dissolving, centrifuging, heating, diluting etc.

A major disadvantage of the currently used liquid and solid processing devices is the need for thorough and immediate cleaning of the container and lid after use, because delayed cleaning may render the cleaning process longer and more difficult. Skipping cleaning may cause damage to the container and to its operative elements and may even cause malfunction. In addition, in some cases, the manufacturer's safety restrictions limit cleaning of the device's container and lid with running water and/or detergents, thus ruling out the possibility to clean them in a dishwasher. Such demands render the usage of liquid and solid processing devices tedious and cumbersome.

Furthermore, in a laboratory, the cleaning and sterilizing procedure of vessels after use can be significantly time consuming and in some cases, leaving trace materials in the equipment may adversely affect subsequent processes.

To date, the art has failed to provide efficient means to prevent or relieve the problems relating to the fouling of equipment after use. It is therefore clear that it would be greatly advantageous to provide means by which the cleaning of liquid or solid equipment after use could be substantially shortened and facilitated, or even in some cases dispensed with.

It is therefore a purpose of the present invention to provide a method and devices that eliminate the need for cleaning liquid and solid processing equipment after use.

It is a further object of the invention to provide a method and means to prevent fouling of equipment used for the processing of liquids and/or solids, be they used for home or for laboratory or industrial applications.

Other objects and advantages of the invention will become apparent as the description proceeds

SUMMARY OF THE INVENTION

The invention relates to a device for the processing of liquids and/or solids, comprising a disposable layer adapted to shield a working surface from coming into contact with, and being fouled by, the processed liquids and/or solids, and apparatus suitable to apply a negative pressure in a gap between said disposable layer and said working surface, thereby causing said disposable layer to adhere to said working surface.

In one embodiment of the invention the disposable layer is made of elastic material. In another embodiment of the invention the disposable layer comprises a metal such as for example aluminum foil and in a further embodiment of the invention the disposable layer comprises a polymer. The disposable layer may also comprise in combination an elastic material and, a non-elastic material and a metallic material.

According to one embodiment of the invention the device is a food processing apparatus, such as mixing, frothing, blending, dicing, cutting or juicing apparatus. In another embodiment of the invention the device is a laboratory processing apparatus, such as mixing, blending, melting, dissolving, centrifuging, heating or diluting apparatus.

In one embodiment of the invention the apparatus suitable to apply a negative pressure comprises a vacuum pump, which may be separate or integral with the device and connected to a gap in the device provided between the disposable layer and the working surface.

The invention is also directed to a shielding aid consisting of a disposable layer adapted to shield a working surface from coming into contact with, and being fouled by, a liquid and/or a solid that is processed in a liquid and/or solid processing apparatus, said shielding aid being suitable to adhere to a surface when a negative pressure is applied in a gap between said shielding aid and said working surface.

In one embodiment of the invention the disposable layer is made of elastic material. The disposable layer may further comprise a metal such as for example an aluminum foil, a polymer or may comprise in combination an elastic material and, a non-elastic material and a metallic material.

Also encompassed by the invention is a shielding system for use in liquid and/or solid processing apparatus, which is adapted to shield a working surface from coming into contact with, and being fouled by, processed liquids and/or solids, comprising a shielding aid according to the invention. The shielding system may further comprise one or more sealing element(s), which may, for instance, comprise an integral or added elastic band. An illustrative example of a sealing element is an O-ring.

The invention is also directed to a working surface for use in a device according to the invention, characterized in that it is integrally provided with a gap between two walls, for the creation of reduced pressure, wherein the wall that supports the working surface is provided with perforations which are adapted to apply a suction action on the shielding aid, when positioned next to said working surface.

All the above and other characteristics and advantages of the invention will be further understood through the following illustrative and non-limitative description of embodiments thereof, with reference to the appended drawings that schematically illustrate various liquid and solid processing apparatus.

Figure 1:
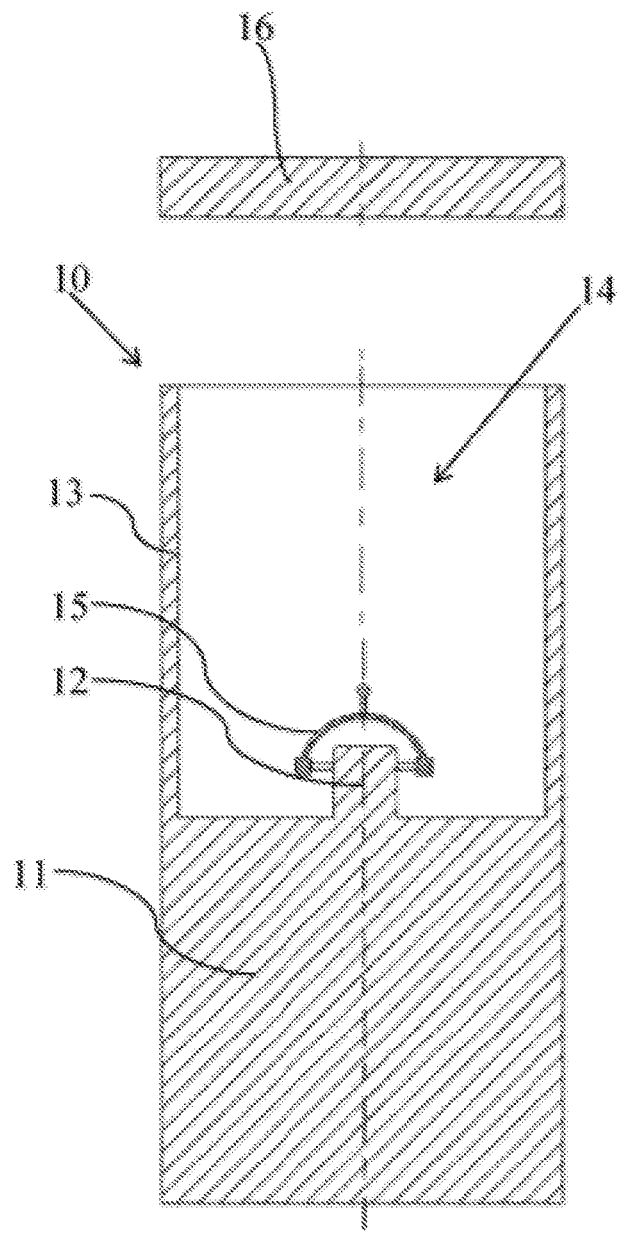
FIG. 1 is a cross-sectional side view of a prior art container of a magnetically operated milk frother.

By "providing reduced pressure" it is meant to indicate that pressure is reduced to create a pressure difference between the two sides of a shield, thereby facilitating its firm attachment to the host container (the reduced pressure yields negative pressure relative to the normal atmospheric pressure).

DETAILED DESCRIPTION OF EMBODIMENTS OF THE INVENTION

According to the present invention a shielding system, comprising one or more shielding elements, is configured to be placed inside a container of liquid or solid material so after the use the shielding system is discarded, and the container is ready for storage or for further use without the need to be cleaned. Throughout this description reference is made mostly to food and beverage as the examples of liquids and solids to be processed, it being understood that the invention is not limited in any way to any specific kind of solid or liquid and anything that is described herein is applicable, mutatis mutandis, to any suitable fluid or solid The shielding system intended for a container is configured to fit the internal size and shape of said container without interfering with its function.

When processing food and beverage materials, the container shield and the lid shield are made of a food-compatible material approved for use with heated food and beverages. Examples of food grade materials of which the container shield and the lid shield can be made include, but are not limited to, food grade aluminum sheet, nylon compatible for the manufacture of cooking bags, cellulose-based paper configured to be used during baking, polyethylene terephthalate (PET), crystallizable polyethylene terephthalate (CPET) and polypropylene.

Furthermore, the container shield and the lid shield do not interfere with any moving parts of the processing equipment. For example, in cases where a moving element is permanently coupled to an actuating element, the container shield and/or the lid shield comprise at least one recess that fits the size and shape of the moving element, thus allowing protrusion of the moving element through the container shield and/or the lid shield. On the other hand, in cases where the moving element is magnetically coupled to an actuating element, the container shield and the lid shield are made of a material that is permeable to a magnetic field. In some other cases, where the operation of a food and beverage processing device involves heating the food or beverage material, the container shield and the lid shield are made of a material that is suitable to transfer heat to the food or beverage material during processing. According to some embodiments of the invention, where the operational functionality of a food and beverage processing device requires a tight attachment of the shield to the host container, e.g., by negative pressure creation, continuous pumping is enabled to maintain sub-atmospheric pressure between the insert and the hosting container.

According to another aspect of the present invention, there is provided a method for protecting an internal surface of a container of a liquid or solid processing device, using a shielding layer to be placed on the working surface of the container of the liquid or solid material, and a device that creates reduced pressure (e.g., a vacuum pump), in order to cause the shield to adhere to the surface of the container and to allow the operating device to work without interference. A shielding layer that does not sufficiently adhere to the working surface of the shielded device may become involved in its operation and be drawn into the moving parts of the apparatus, which may cause severe malfunctioning and which may leave the surface to be shielded from fouling, uncovered. With proper keeping in place of the shield, on the other hand, the container remains clean during and after use.

Illustrative devices and systems described hereinafter are exemplary and meant for the purpose of illustration and not meant to limit the invention in any way. Elements having similar functions are indicated in the drawings with the same numerals.

FIG. 1 shows a cross-sectional side view of a prior art container of a magnetically operated milk frother, used herein to illustrate a container of a liquid processing device. The container of the milk frother, indicated by numeral 10, comprises a body 11, a magnetic whisk base 12, walls 13 that define an internal space 14, a magnetic whisk 15 functioning as a moving element, and a lid 16.

Before operation, the magnetic whisk 15 is placed over the magnetic whisk base 12, milk is poured into the internal space 14, and the container 10 is covered with the lid 16 and placed on an electric base of the milk frother (not shown). The milk is foamed by operating an electric motor (not shown) in the milk frother device, which turns a magnet (not shown) positioned for example inside the magnetic whisk base 12, which causes the magnetic whisk 15 to hover and rotate above the magnetic whisk base 12 and thereby foam the milk. In some embodiments, the milk may be heated during foaming by operating a heating element (not shown) which warms up the walls 13 and/or bottom of the container 10, which in turn warm up the milk. The foamed milk is then poured out from the container for use, and the internal surfaces of the walls 13 of the container 10, the lid 16 and the magnetic whisk 15, should be cleaned immediately after use for hygienic purposes and in order to avoid damage to the container 10.

Figure 2:
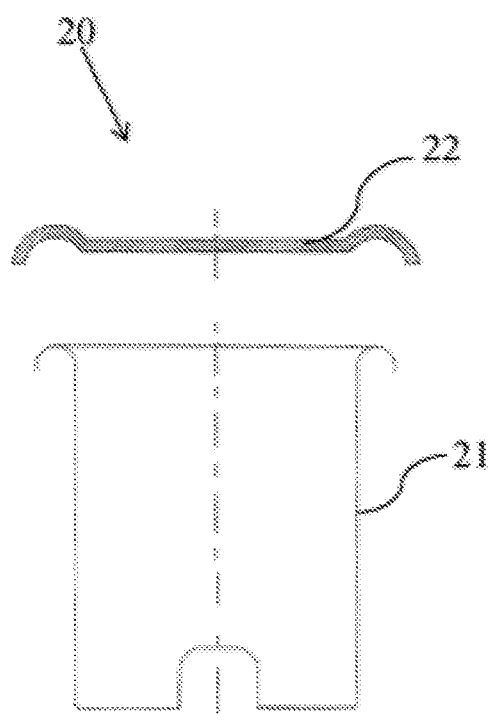
FIG. 2 is a cross-sectional side view of an internal shielding system for use with a container of a magnetically operated milk frother, in accordance to an embodiment of the present invention.

FIG. 2 schematically illustrates a cross-sectional side view of a shielding system 20 for use with a container 10 of a magnetically operated milk frother, such as that shown in FIG. 1. The shielding system 20 eliminates the need to clean the container 10 after use.

According to an embodiment of the present invention, the shielding system 20 comprises a shield 21, which corresponds in size and shape to the internal surface of the container 10, including the shape of the walls 13 and the magnetic whisk base 12. Shield 21 prevents contact between the milk and the internal walls 13 of the container 10 and magnetic whisk base 12. Shield 21 is permeable to magnetic fields, and allows the rotation of the magnetic whisk 15 during foaming of the milk. In addition, shield 21 is made of a material which is suitable to transfer heat from the walls 13 and/or the bottom of the container 10 to the milk, and allows warming of the milk during foaming in a manner similar to warming the milk without using the shield 21. Furthermore, shield 21 is made of a material that is approved for usage as a packaging material for milk, more particularly for warm milk. The shielding system 20 further comprises a lid shield 22, which is suitable to shield the internal surface of the lid 16 of container 10 and the upper part of container 10 from fouling. Lid shield 22 prevents contact between the milk and the internal surface of the lid 16 during foaming the milk and is configured to avoid spillage of milk from the container 10 during foaming.

Figure 3A:
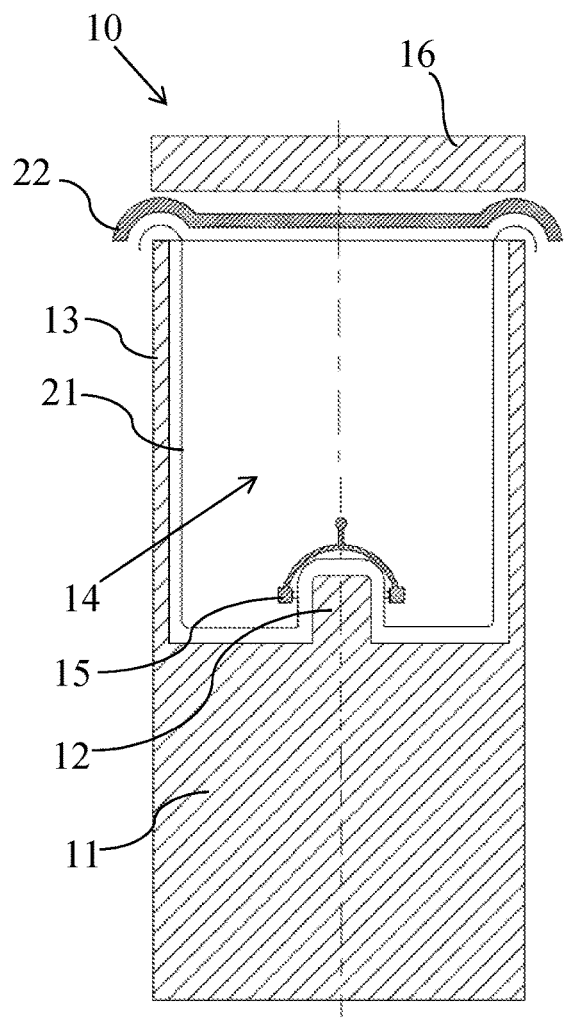
FIGS. 3A-3B schematically illustrate two internal shielding systems assembled in two examples of a magnetically operated milk frother, in accordance with two embodiments of the present invention.
Figure 3B:
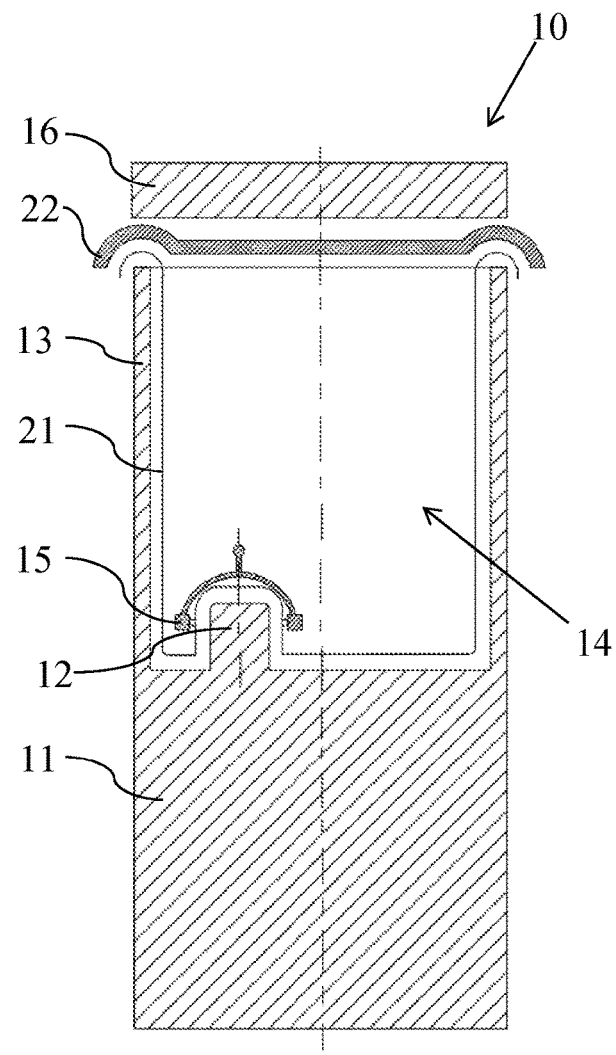

FIGS. 3A and 3B schematically illustrate two embodiments of a shielding system (similar to shielding system 20 of FIG. 2), used for two different configurations of a magnetically operated milk frother 10, which show different positions of the magnetic whisk base 12 and correspondingly differently shaped shield 21.

It should be noted that in this figure and in the figures to follow the air gap, where the reduced pressure is applied, is shown in exaggerated size and not in scale, for the sake of clarity of the explanation.

FIG. 3A is an example in which the magnetic whisk base 12 is positioned at the center of the bottom (concentrically) of the container 10 of the milk frother. Accordingly, the shield 21 has a protrusion at the center of its bottom that fits the size and shape of the magnetic whisk base 12.

FIG. 3B is an example in which the magnetic whisk base 12 is positioned at the side of the bottom of the container 10 (non-concentrically) of the milk frother. Accordingly, the shield 21 has a protrusion at the side of its bottom that fits the size and shape of the magnetic whisk base 12.

Figures 4A, 4B, 4C:
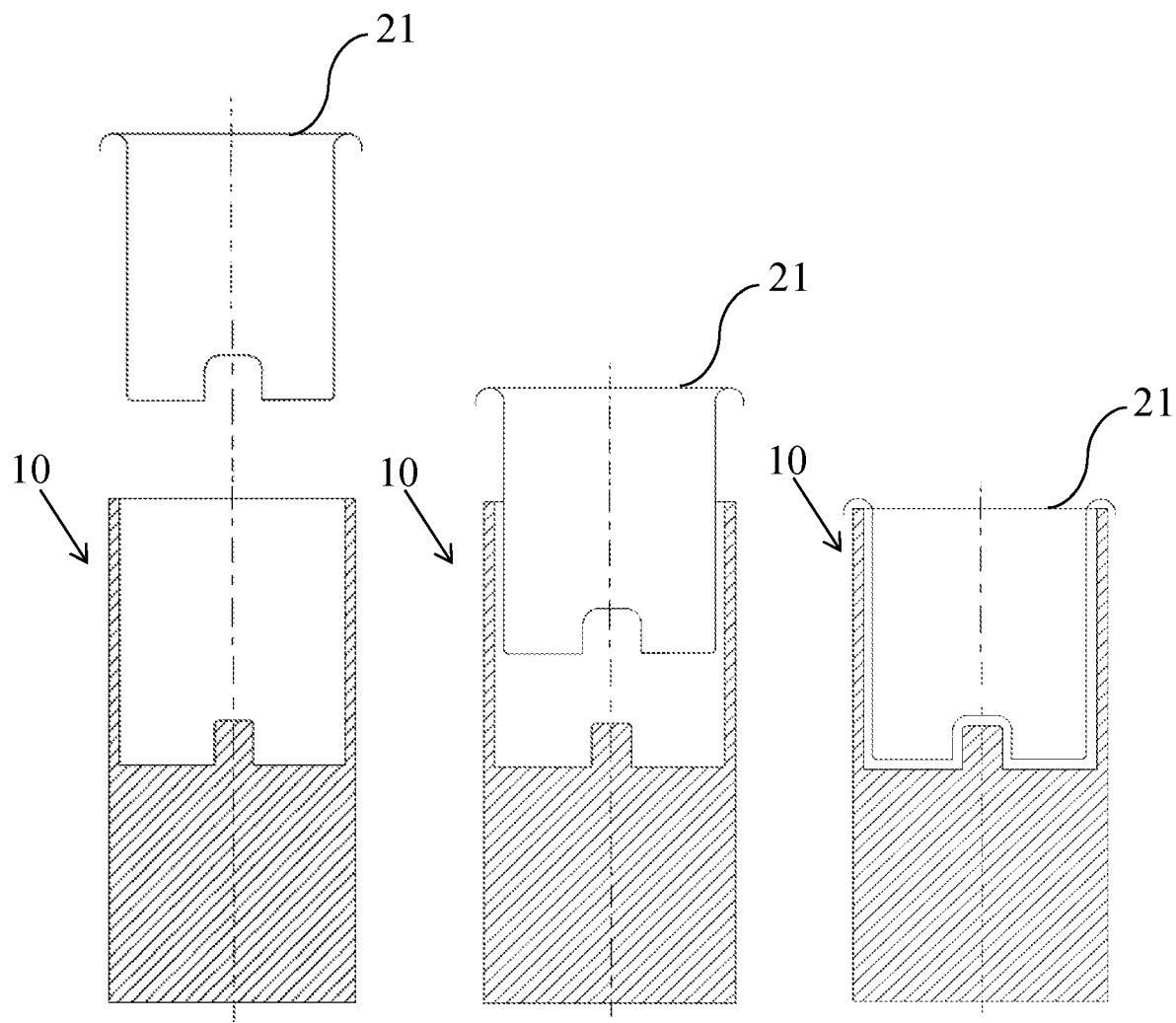
FIGS. 4A-4F schematically illustrate stages of use of the invention in a milk frother comprising a magnetic whisk and a lid.
Figure 4D:
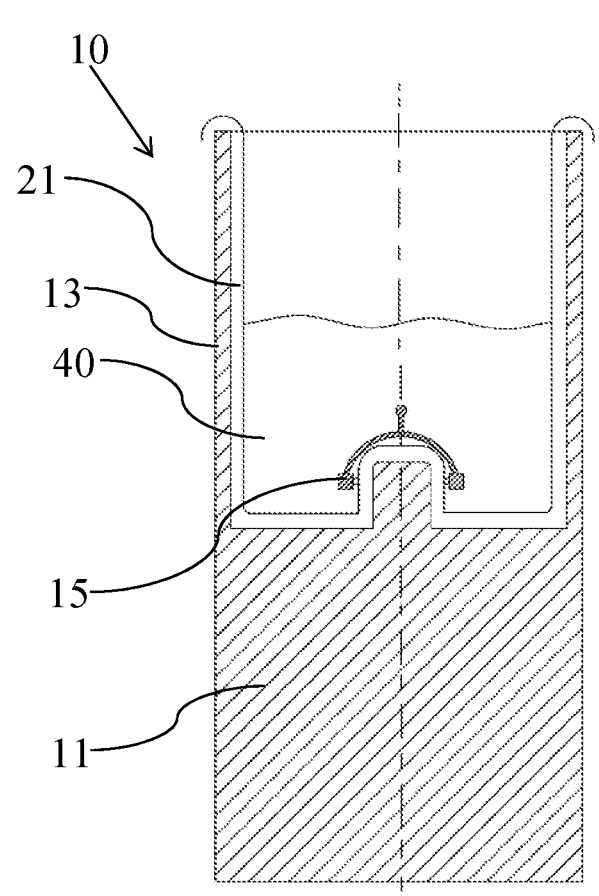
Figure 4E:
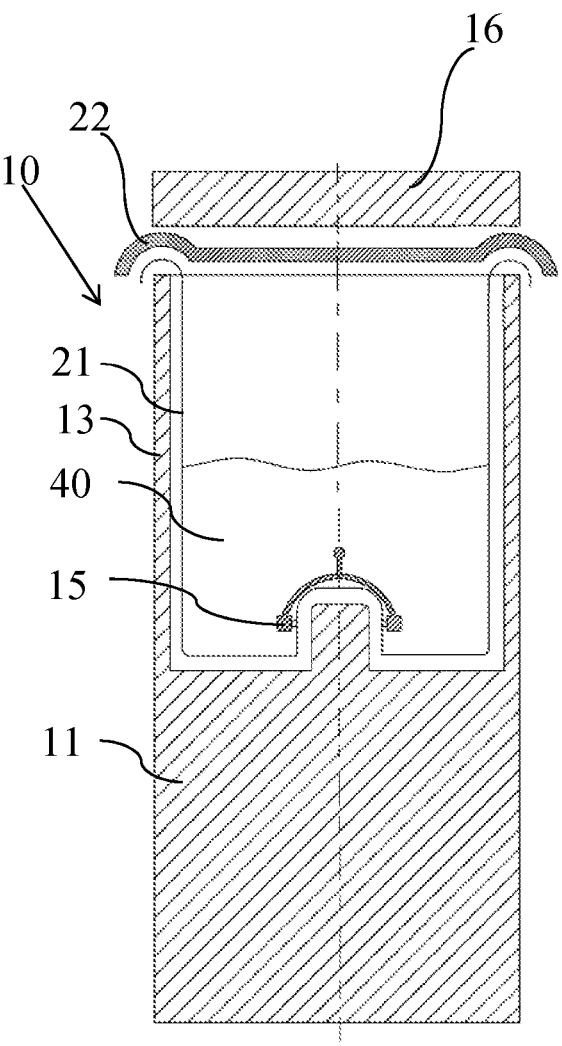
Figure 4F:
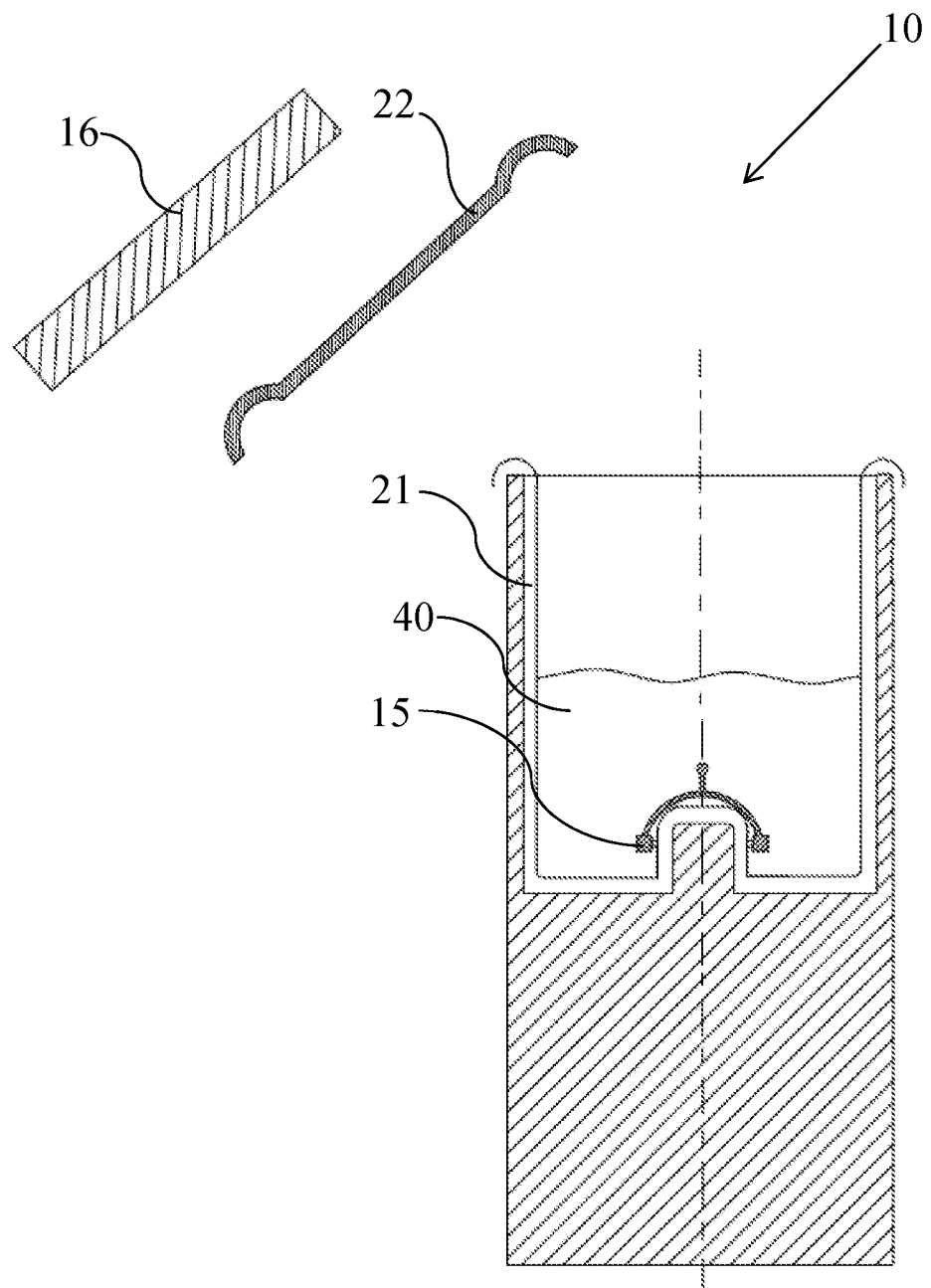

Once shield 21 is assembled, it prevents contact between the milk and the container 10. FIGS. 4A-4F schematically illustrate stages of use of the invention with a milk frother comprising a magnetic whisk 15 and a lid 16 while covering an internal surface 14 of the container 10 and lid 16. The steps comprise: inserting a shield 21 into a container 10 of a milk frother, as illustrated in FIGS. 4A-4C; inserting a magnetic whisk 15 into the container 10, as illustrated in FIG. 4D; filling the container 10 with milk 40, as illustrated in FIG. 4D; covering the container 10 with a lid shield 22, as illustrated in FIG. 4E; placing a lid 16 over the lid shield 22, as illustrated in FIG. 4E; foaming the milk 40 by actuating the magnetic whisk 15 and optionally also warming the milk 40 during foaming (not shown); removing the lid 16 and the lid shield 22, as illustrated in FIG. 4F; pouring out the foamed milk 40 from the container 10 (not shown); alternatively, discarding milk 40 leftovers, removing the magnetic whisk 15 from the container 10, and removing the shield 21 from the container 10.

The shield 21 and the lid shield 22 can be discarded while the container 10 and lid 16 of the milk frother do not need any cleaning and are immediately ready for storage or further use.

Figure 5:
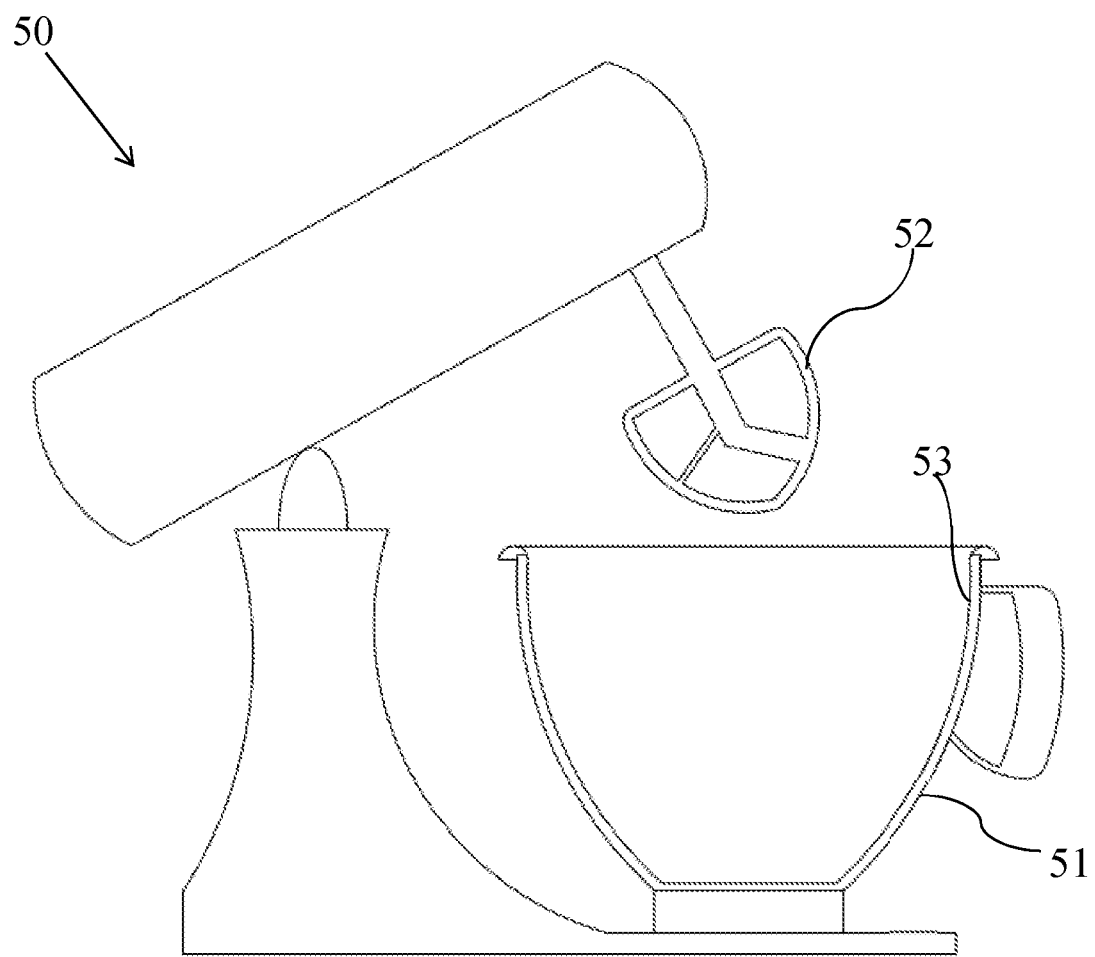
FIG. 5 is a cross-sectional view of a prior art dough kneader provided with an internal shielding system, in accordance to an embodiments of the present invention.

FIG. 5 is a cross-section view of a prior art dough kneader 50 provided with a shielding system, which in this case consists of a single shield 53. It should be noted that the dough kneader 50 is only an example of a processing device comprising a container in the form of a bowl. Internal shielding systems for all types of devices that comprise a vessel, for example mixers and the like, are within the scope of the present invention.

The dough kneader 50 comprises a bowl 51 where ingredients of dough are placed; and a dough beater 52, which is an example of a moving element, used for kneading the dough in the bowl 51.

In order to avoid contact between the dough and the internal surface of the bowl 51 a shield 53 is provided, which is configured to cover the internal surface of the bowl 51, and obviates the need to clean the bowl 51 after use.

Figure 6:
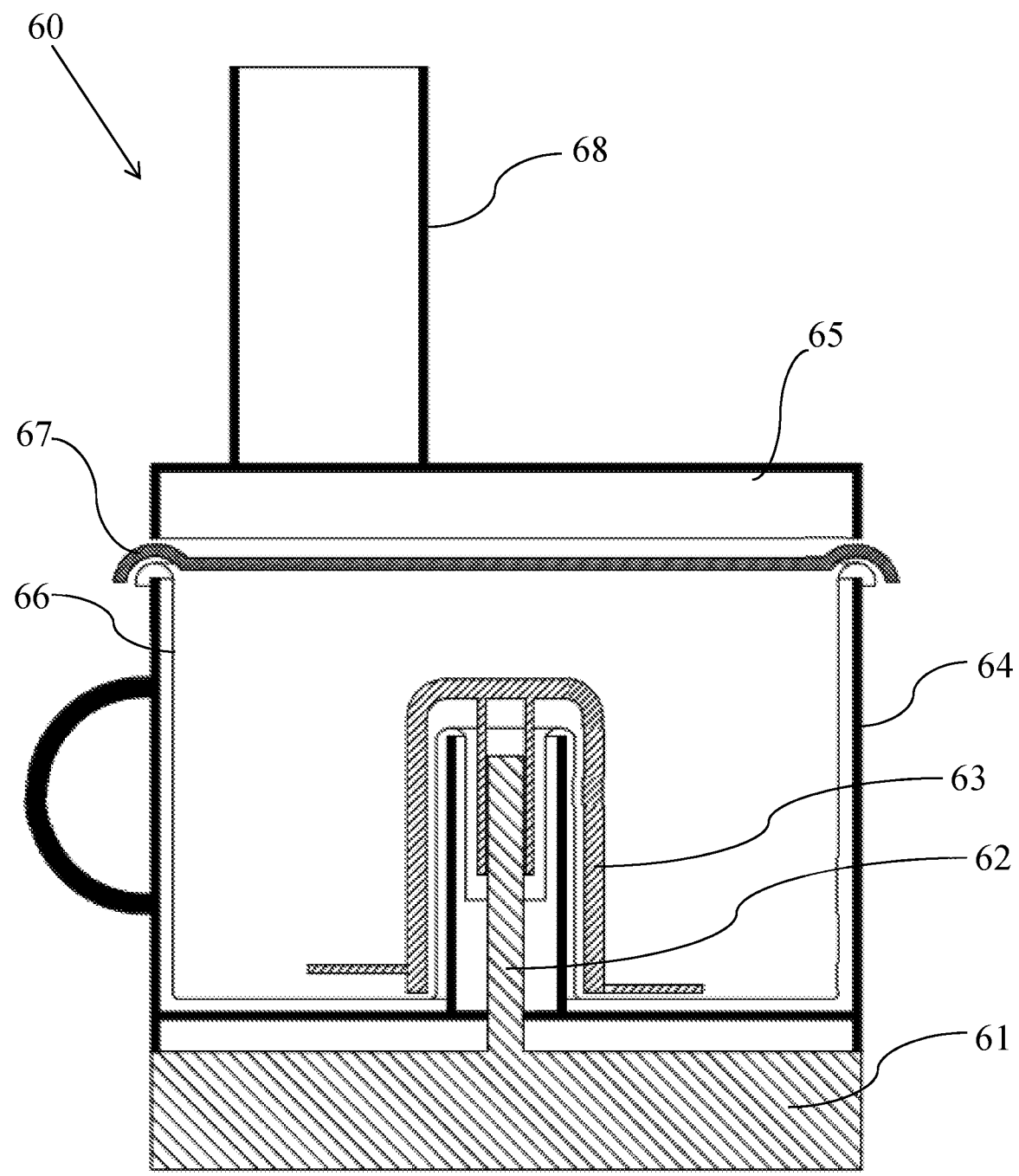
FIG. 6 is a cross-sectional view of a prior art food processor provided with an internal shielding system, in accordance to an embodiment of the present invention.

FIG. 6 is a cross-sectional view of a prior art food processor 60, fitted with a shielding system according to the invention. The food processor 60 comprises a motor base 61; a motor shaft 62 connected to the motor base 61; rotating blades 63 are removable coupled to the motor shaft 62; bowl 64 receives solid and liquid materials for processing; a lid 65 covers the bowl 64 and avoids spillage of materials during processing. Sealing elements are provided (not shown) as illustrated with reference to FIG. 13 (A-C), to prevent the loss of the required pressure difference between the two sides of the shield In order to avoid contact between the food materials and the internal surface of the bowl 64 during processing, the present invention provides a shielding system, which in this particular configuration comprises a bowl shield 66 adapted to cover the internal surface of the bowl 64, and thereby obviating the need to clean the bowl 64 after use. The bowl shield 66 comprises a recess corresponding to the motor shaft 62. When the bowl shield 66 is placed in the bowl 64, the motor shaft 62 extends through the recess in the bowl shield 66.

According to some embodiments of the invention, in order to avoid contact between the food materials and the internal surface of the lid 65 during processing, the shielding system further comprises a lid shield 67, which is suitable to shield the internal surface of lid 65 and the upper part of the bowl 64 from fouling. The lid shield 67 may be configured to fit the internal surface of the lid 65 and the upper part of the bowl 64, to avoid contact between the food materials and the internal surface of the lid 65 during processing, and avoid the need to clean the lid 65 after use.

If the lid 65 of a food processor 60 comprises, as in the example shown in the figure, a feed tube 68 to allow feeding of food materials into the bowl 64 during processing when the lid 65 covers the bowl 64, the lid shield 67 comprises an opening, which corresponds in size and shape to the opening of the feed tube 68, in order to allow passage of food materials into the bowl 64 from the feed tube 68.

Figure 7:
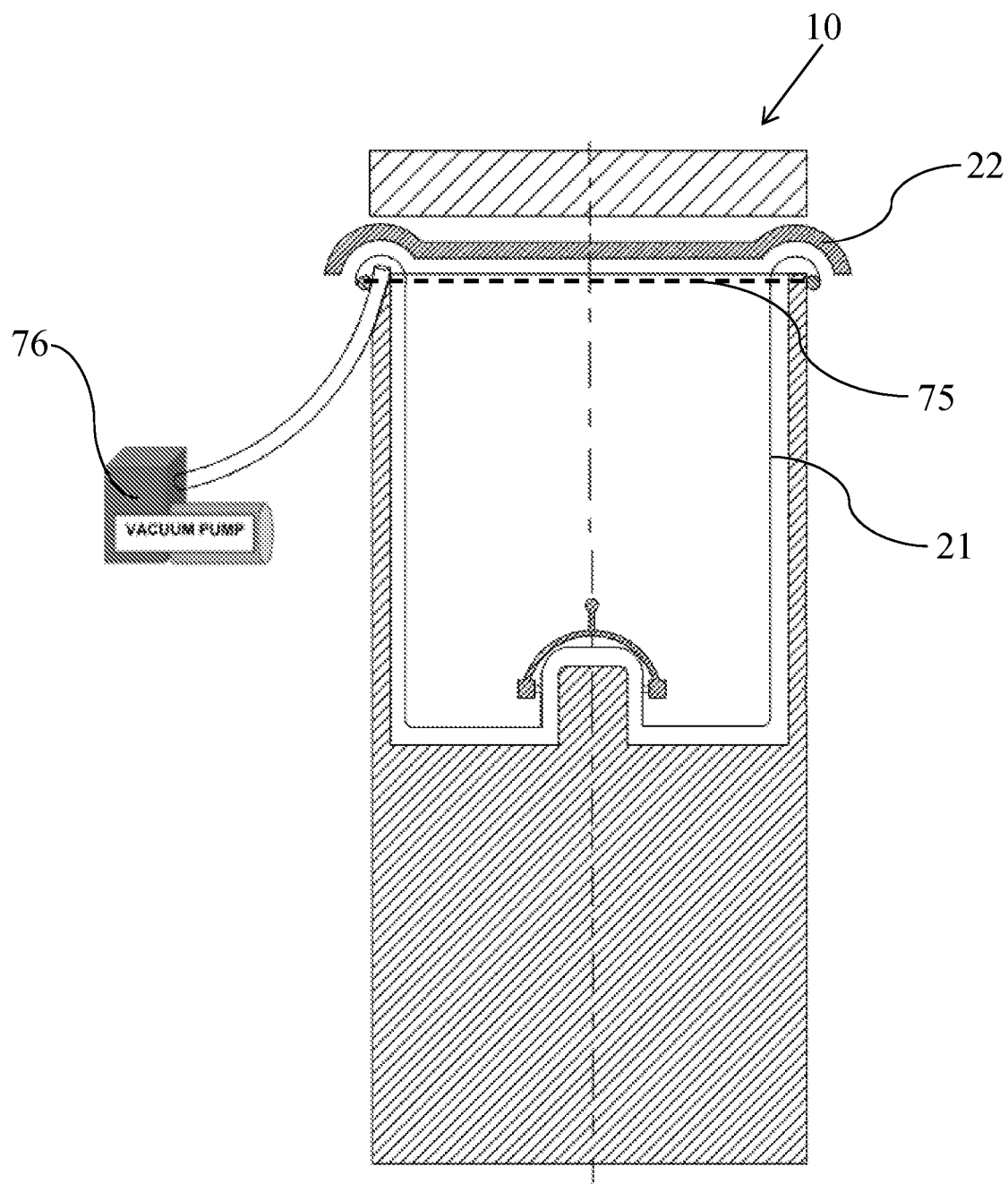
FIG. 7 is a cross-sectional view of a container of a magnetically operated milk frother, showing an internal shielding system further comprising an elastic band and a negative pressure creating device (NPCD), i.e., a device that enables continuous or non-continuous pumping to maintain sub-atmospheric pressure between the insert and the hosting container in accordance to an embodiment of the present invention.

FIG. 7 is a cross-sectional view of a shielding system for use with a container 10 of a magnetically operated milk frother. Besides the shield 21 and the shield lid 22 (described with reference to FIGS. 1 and 2), there are further provided an elastic band 75 (the back side of the elastic band is shown as a dashed line for clarity) and an NPCD 76, which in this particular example is a vacuum pump. According to one embodiment of the invention, the flexible margin of shield 21 is folded over the edge of the container 10 and the elastic band 75 is placed over the folded margin of shield 21 in order to fasten said margin to the edge of the container 10. The elastic band can also be incorporated into the shield part itself (similarly to the rubber band that is found for example in shower caps). Using the vacuum pump 76 causes shield 21 to adhere to container 10 and allows smooth rotation of the magnetic whisk 15 around the magnetic whisk base 12 and efficient heat conduction from the walls 13 to the milk 40.

Shields such as, for example, a milk foamer shield, can be made of different materials, for instance, with side walls that are rigid (as in a plastic disposable cup) and the bottom and whisk areas that are flexible and can be made, e.g., of aluminum foil and/or of a flexible polymer such as nylon. The folded margins may also be flexible or more rigid.

Figure 8:
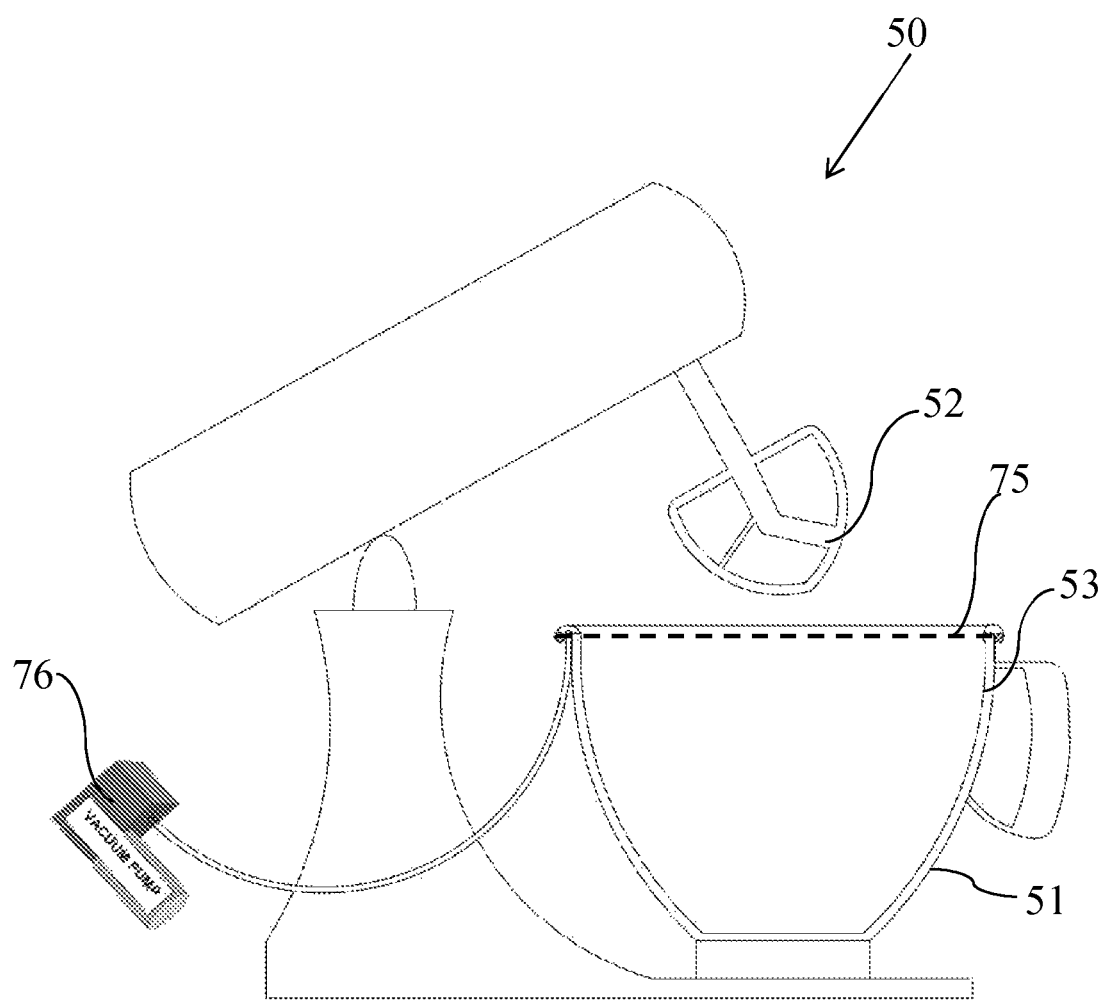
FIG. 8 is a cross-sectional view of a bowl of a dough kneader provided with an internal shielding system, further comprising an elastic band and an NPCD, in accordance to an embodiment of the present invention.

FIG. 8 is a cross-sectional view of a shielding system for use with a bowl 51 of a dough kneader 50 (such as described in FIG. 5), further provided with an elastic band 75 and an NPCD 76, such as a vacuum pump. It should be noted that the dough kneader 50 is only an example of a processing device comprising a container in the form of bowl.

Shielding systems for all types of devices that comprise a vessel, for example mixers and the like, are within the scope of the present invention.

According to one embodiment of the invention, the flexible margin of a bowl shield 53 is folded over the edge of the bowl 51 and the elastic band 75 is placed over the folded flexible margin of the bowl shield 53 in order to attach the margin to the edge of the bowl 51, or is integral with it. Using the vacuum pump 76 causes shield 53 to adhere to the bowl 51 and prevents tearing or folding of the bowl shield 53 by the dough beater 52 or the highly viscous mixed material during operation of the dough kneader 50.

Figure 9:
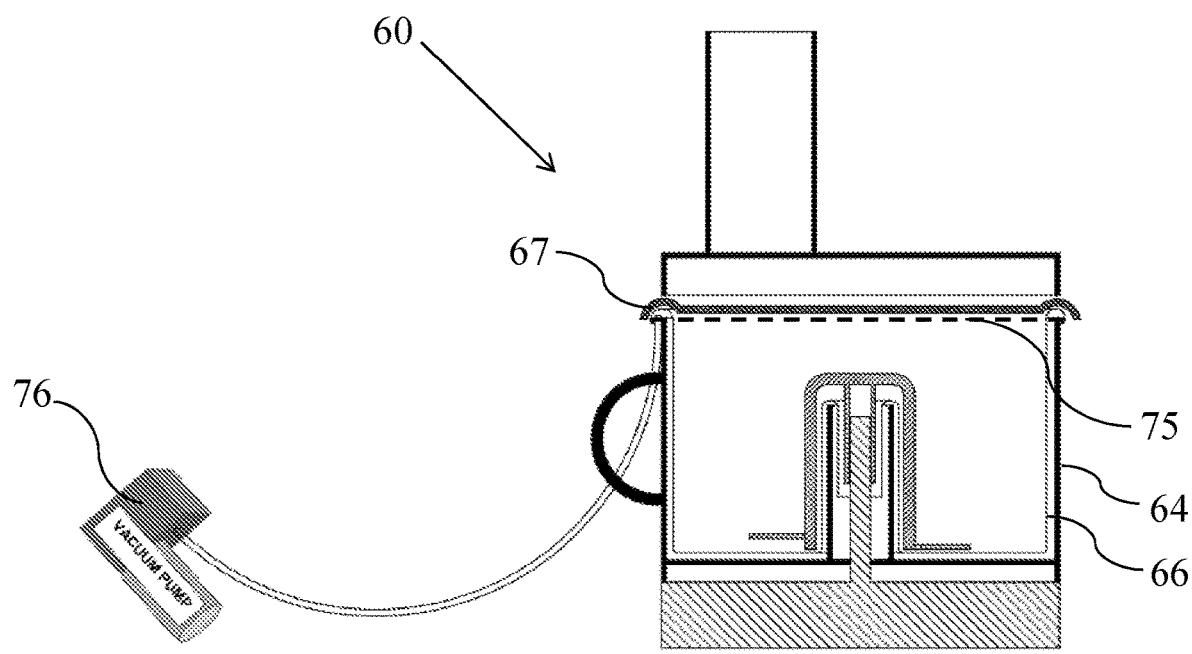
FIG. 9 is a cross-section view of a bowl of a food processor provided with an internal shielding system, further comprising an elastic band and an NPCD, in accordance to an embodiment of the present invention.

FIG. 9 is a cross-sectional view of a shielding system for use with a bowl 64 of a food processor, further provided with an elastic band 75 and an NPCD 76, such as a vacuum pump. According to one embodiment, the flexible margin of a bowl shield 66 is folded over the edge of the bowl 60 and the elastic band 75 is placed over the flexible folded edge of the bowl shield 66 in order to attach the margin to the edge of the bowl 64, or is integral with it. The use of the vacuum pump 76 will allow the bowl shield 66 of a food processor 60 to adhere to the internal surface of the bowl 64, and thus prevents tearing or folding of the bowl shield 66 by the food material processed by the food processor 60. A sealing element is provided at the bottom of the food processor around shaft 62 (not shown) as illustrated with reference to FIG. 13 (A-C), to prevent the loss of the required pressure difference between the two sides of the shield.

The shielding system of the invention fulfill the need for a tight positioning of a shield to the working surface of a container by using an NPCD in addition to the elastic band 75. According to one embodiment, the NPCD is configured to create a reduced pressure in the area between a flexible shield and a working surface of a container which is covered by the shield which is flexible and adjusts its shape and size to a given container under the effect of such reduced pressure. Thus, the shield tightly adheres to the working surface of the container. In order to generate a reduced pressure between the working surface of the device and the shield any suitable device can be used, as long as it is configured to maintain the reduced pressure throughout the operation of the processing apparatus. These may include both vacuum pumps (electrically or mechanically operated) or the like and mechanical devices suitable to withdraw air from the interstice between the shield and the working surface.

According to an embodiment of the invention, the NPCD is configured to actively block reentrance of air into the gap between the flexible shield and the working surface of the container, which may be important if the negative pressure is not continuously generated. Of course, in one embodiment of the invention continuous pumping is used, thus causing continuous negative pressure.

Figure 10A:
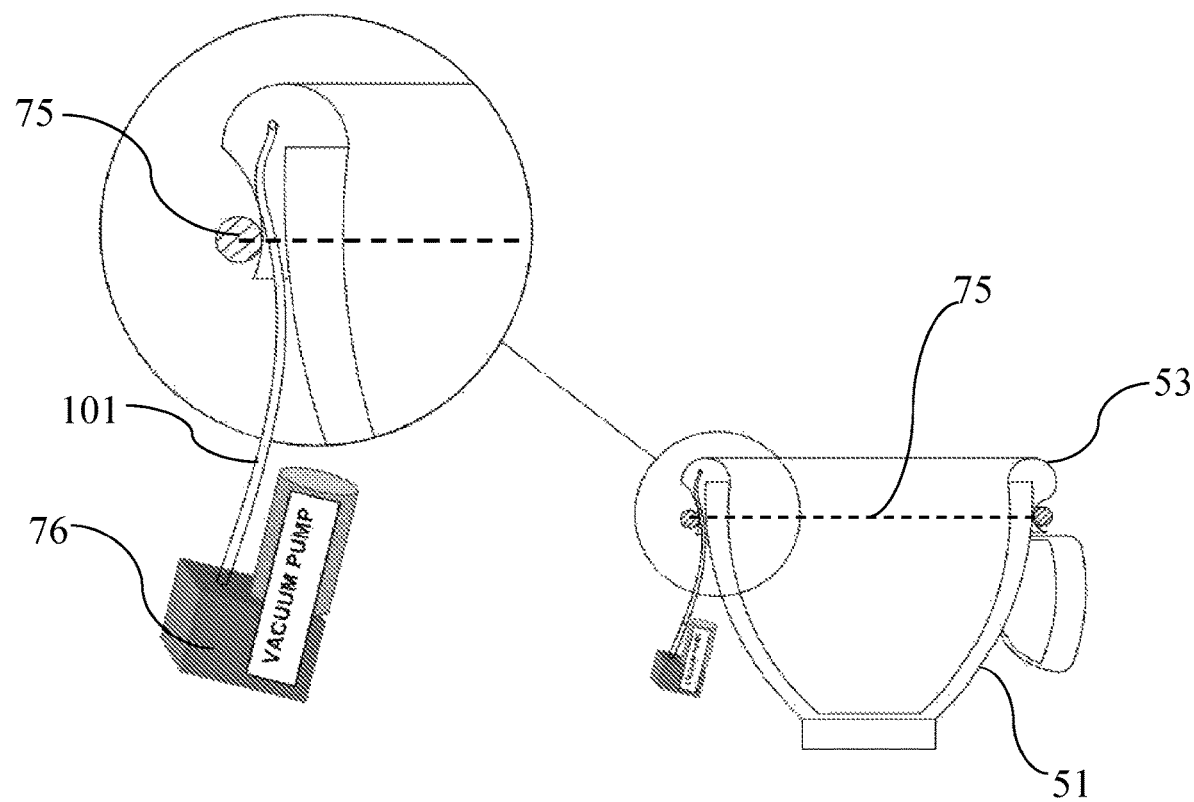
FIG. 10A is a cross-sectional view of a bowl of dough kneader provided with an internal shielding system, comprising a vacuum pump and an elastic band according to an exemplary embodiment of the present invention.

FIG. 10A is a cross-sectional view of a container (a bowl) 51, provided with a shield 53, an elastic band 75, which can be separate or integral with the shield and an NPCD, which may be, e.g., a vacuum pump 76, which is in fluid connection with a conduit 101. Shield 53 covers the working surface of the bowl 51, while the flexible edge of shield 53 is folded over the edge of the bowl 51; the elastic band 75 is placed over the margin of the shield 53; and the conduit 101, which is connected to the vacuum pump 76, is inserted into a gap between shield 53 and bowl 51, for sucking air from the gap and tightly maintaining shield 53 on the working surface of the bowl 51.

After processing a food or beverage (or any other material) with a bowl 51 tightly covered with a flexible shield 53, and removing the processed material from the bowl 51, tightly attached shield 53 is removed.

According to this example, shield 53 is released by turning of the vacuum pump 76 and releasing the elastic band 75. This allows air to enter into the gap between shield 53 and the working surface of the bowl 51, and shield 53 is released.

Figure 10B:
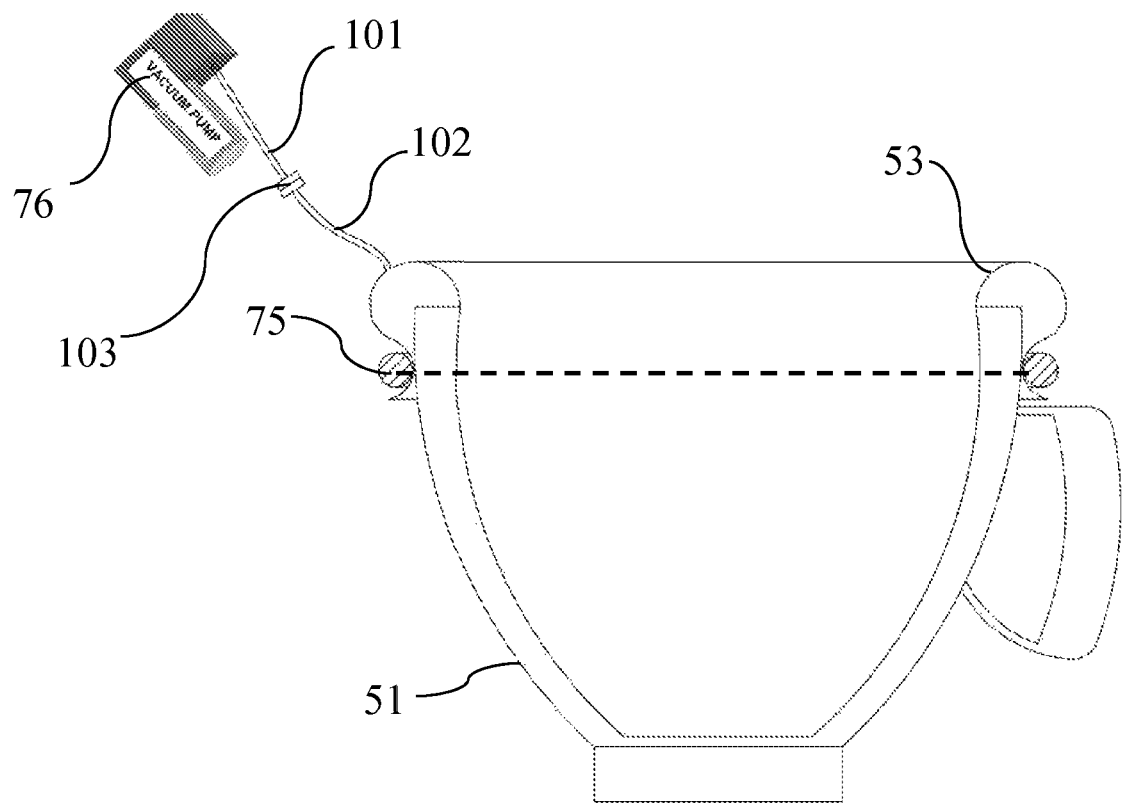
FIG. 10B is a device similar to that of FIG. 10A, with the difference that the shielding system is provided with an integral connection to the NPCD.

According to another embodiment, shown in FIG. 10B, shield 53 comprises an opening configured to allow insertion of a conduit of an air sucking element. Bowl 51 is covered with shield 53, which comprises an opening conduit 102, an elastic band 75 and an air sucking element, which according to one embodiment comprises a conduit 101 of the vacuum pump 76, in fluid connection, through conduit 102, with shield 53 that covers the working surface of bowl 51. The flexible edge of shield 53 is folded over the edge of bowl 51; the elastic element 75 is placed over the margin of shield 53. The vacuum pump 76 sucks air from the gap and tightly attaches shield 53 to the working surface of bowl 51. According to this embodiment, during processing of a food or beverage using the covered bowl 51, the vacuum pump 76 continues to operate. In other words, after sucking the air from the gap and tightly attaching shield 53 to the working surface of bowl 51, the conduit 101 of the air NPCD remains inserted through the opening conduit 102 of shield 53 in order to keep sucking air and block reentrance of air into the gap between shield 53 and the working surface of bowl 51 during usage. Only after usage, the vacuum pump 76 is turned off and the conduit 101 is released from the opening conduit 102 in order to allow entrance of air into the said gap and allow the release and disposal of shield 53.

According to an embodiment of the invention a connector 103 is provided between conduit 101 and conduit 102, which may be made of one or two parts. Coupling of connector 103 enables the flow of air from the shield area into the pump.

According to an additional aspect of the present invention, there is provided a liquid and solid processing device comprising an integral vacuum system. Several embodiments of illustrative processing devices comprising an integral vacuum system are described with reference the following figures.

Figure 11A:
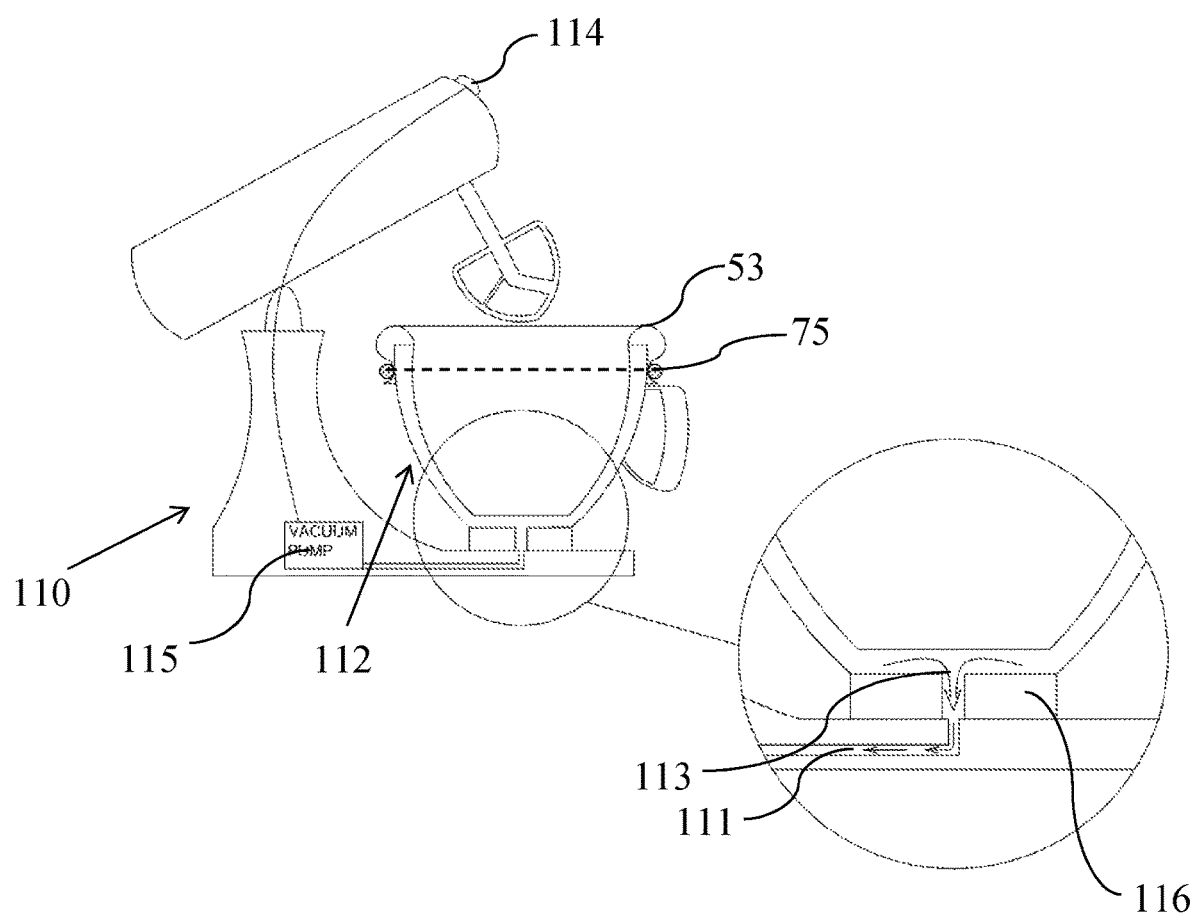
FIGS. 11A-11C show three different ways of providing reduced pressure in apparatus comprising a mixer, according to different embodiments of the present invention.

FIG. 11A shows a mixer 110 comprising an internal vacuum pump 115 in fluid connection with an internal vacuum conduit 111, which reaches the bottom of a perforated container 112 of the mixer 110. The bottom perforated container 112 comprises at least one hole 113 at a position, which is in contact with a part of the mixer during operation, for example at the bottom of the perforated container 112. The position of the at least one hole 113 of the bottom perforated container 112 corresponds to at least one end of the internal vacuum conduit 111 at the part of the mixer 110, which is in contact with the bottom perforated container 112, for example a base 116 of the mixer 110 on which the bottom perforated container 112 is placed during operation. When a shield 53 is placed on the internal surface of the bottom perforated container 112, the bottom perforated container 112 is placed on the base 116, and the internal vacuum pump 115 is actuated, air entrapped between the shield 53 and the internal surface of the bottom perforated container 112 is sucked, and the shield 53 is tightly attached to the internal surface of the bottom perforated container 112. According to one embodiment, an elastic band 75 attaches the flexible margin of the shield 53 to the edge of the bottom perforated container 112 in order to facilitate the creation of reduced pressure between the shield 53 and the internal surface of the bottom perforated container 112.

According to one embodiment, there is provided a switch 114 electrically connected to the internal vacuum pump 115. The switch 114 is configured to be used by user to actuate and/or turn-off the internal vacuum pump 115. This allows operation of the internal vacuum pump 115 independently of the operation of the mixer 110. According to another embodiment, the internal vacuum pump 115 is electrically connected to an actuating mechanism of the mixer 110. Thus, the internal vacuum pump 115 is actuated when the mixer 110 is actuated.

Figure 11B:
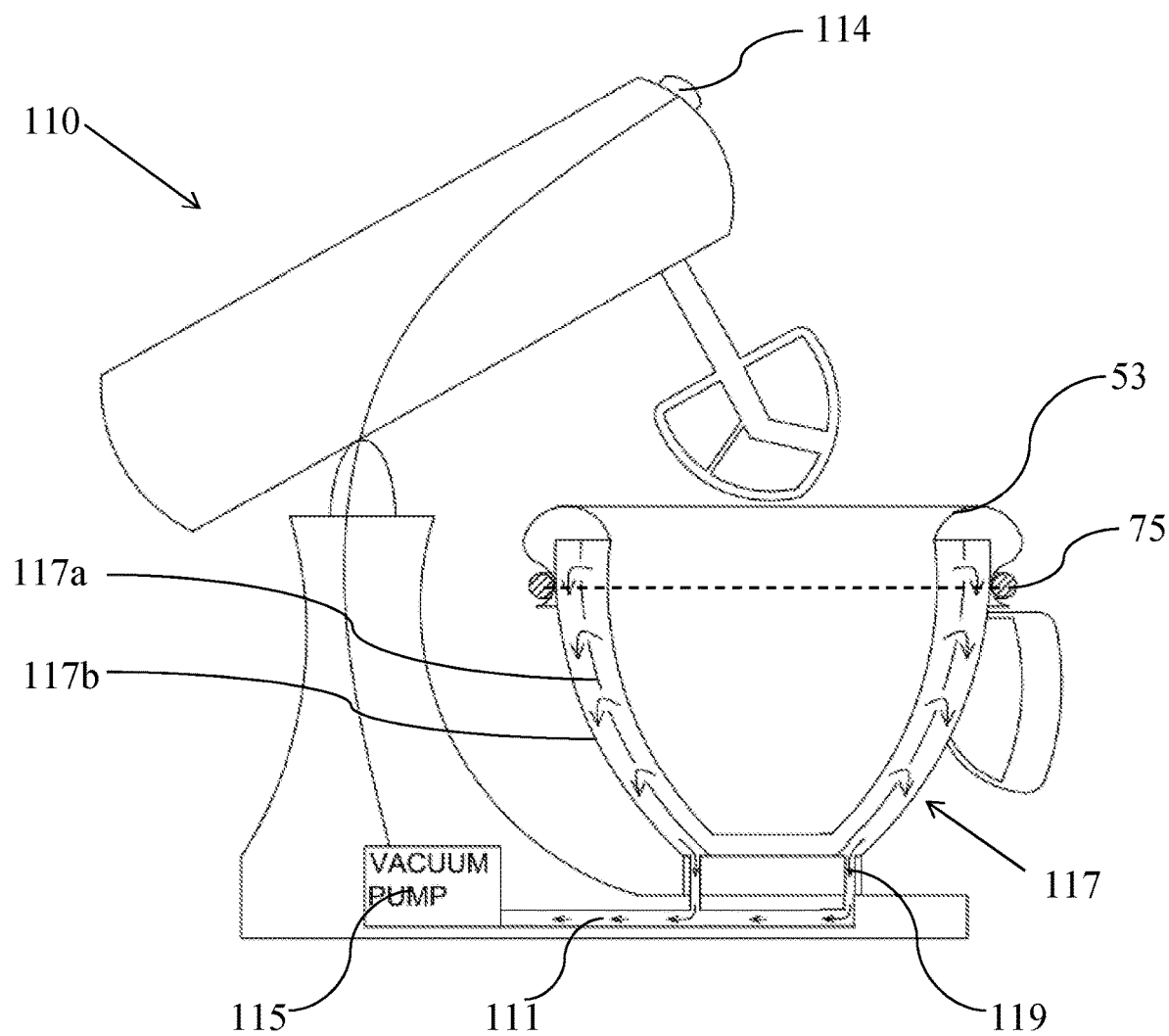

FIG. 11B schematically illustrates another exemplary embodiment of the invention, in which a mixer 110 comprises a shielding system with shield 53 (also referred to as "foil"). The features of the vacuum system illustrated in FIG. 11A apply to the embodiment illustrated in FIG. 11B, except that the double-walled container 117 is designed to have two walls in which the inner wall 117a is perforated and the outer wall 117b is not. The outer wall 117b comprises at least one hole at the bottom—bottom hole 119, similarly to the embodiment illustrated in FIG. 11A. Air flows from the gap between the shield and the inner wall (thereby causing the shield to attach to the inner wall) and then into the gap between the inner and outer walls and through bottom hole (or holes) 119, into the conduit and the NPCD.

Figure 11C:
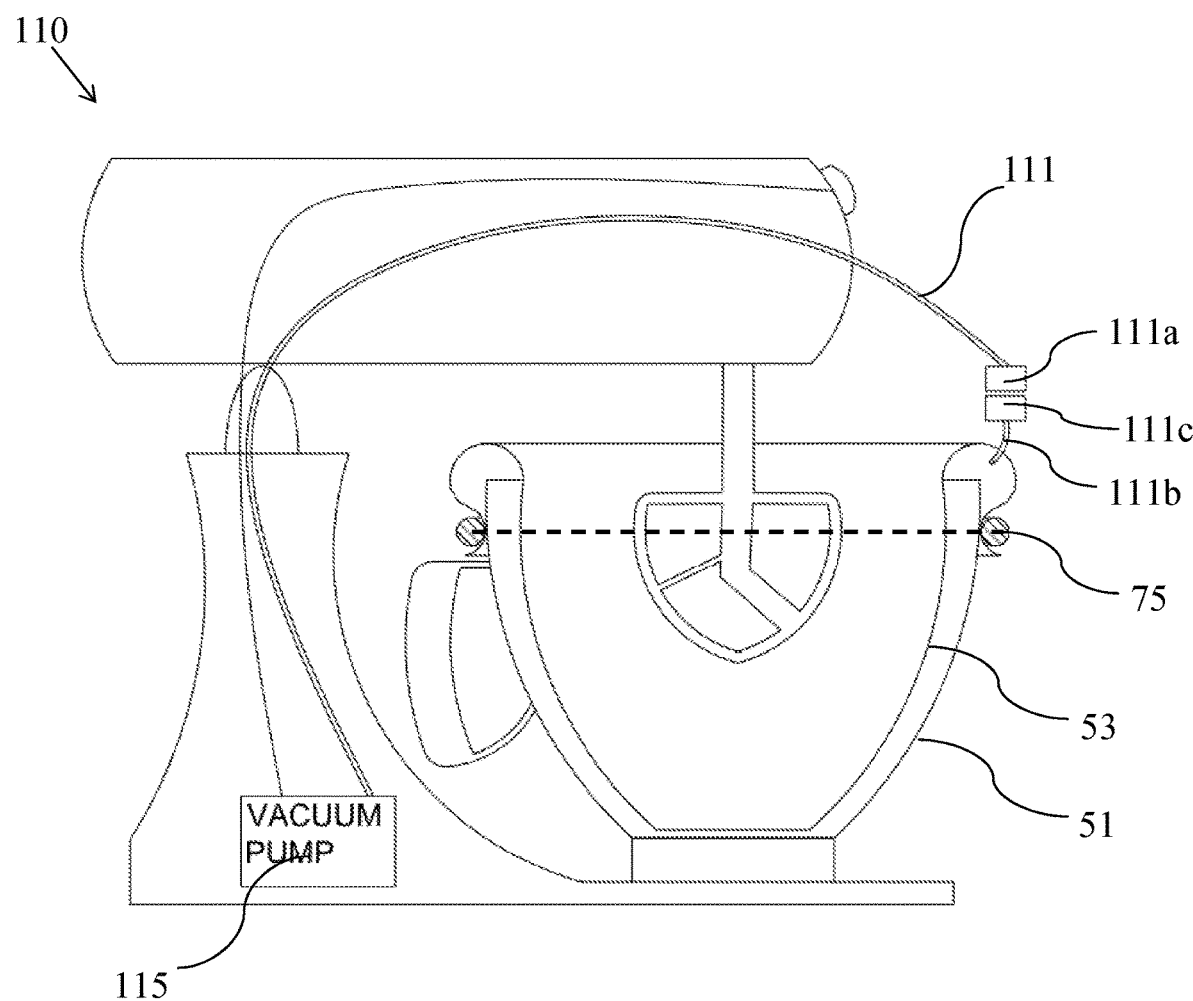

FIG. 11C is yet another exemplary embodiment in which a mixer 110 comprises a vacuum system. The features illustrated in FIG. 11A apply to the embodiment illustrated in FIG. 11C, except that the internal vacuum conduit 111 is elastic and comprises a conduit connector 111a at its end. In addition, a suction tube 111b is attached to the shield 53, and a suction tube connector 111c is attached to an end of the suction tube 111b. The conduit connector 111a of the vacuum conduit corresponds to the suction tube connector 111c of the suction tube 111b.

Thus, when shield 53 is placed on the working surface of the bowl 51, the suction tube connector 111c is connected to the conduit connector 111a, and the internal vacuum pump 115 is actuated and air entrapped between the shield 53 and the working surface of bowl 51 is withdrawn, so they are tightly attached together.

Figure 12A:
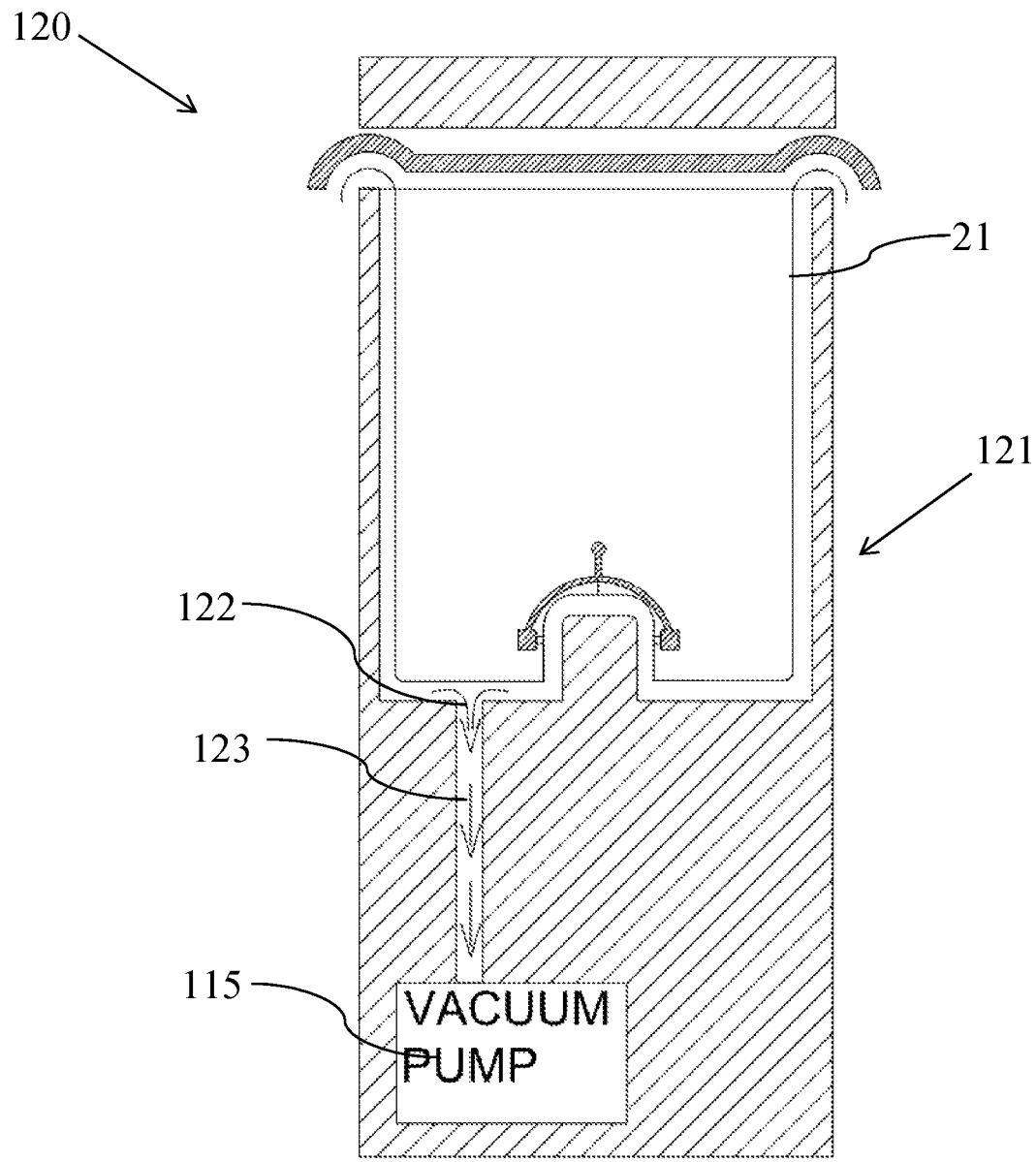
FIGS. 12A-12C show three different ways of providing reduced pressure in apparatus comprising a milk frother, according to different embodiments of the present invention.

FIG. 12A schematically illustrates a milk frother 120 comprising a vacuum system. The features of the vacuum system illustrated in FIG. 11A apply to the embodiment illustrated in FIG. 12A. The container 121 of the milk frother 120 comprises at least one hole 122 configured to be in direct contact with at least one end of a vacuum conduit 123, which is in fluid connection with an internal vacuum pump 115. When shield 21 is placed on the working surface of a container 121 of the milk frother 120, and the internal vacuum pump 115 is actuated, air entrapped between shield 21 and the working surface of the container 121 is withdrawn, and shield 21 is tightly attached to the working surface of the container 121. According to one embodiment of the invention, an elastic band (not shown) attaches a margin of shield 21 to the edge of the container 121 in order to facilitate the creation of vacuum between them.

Figure 12B:
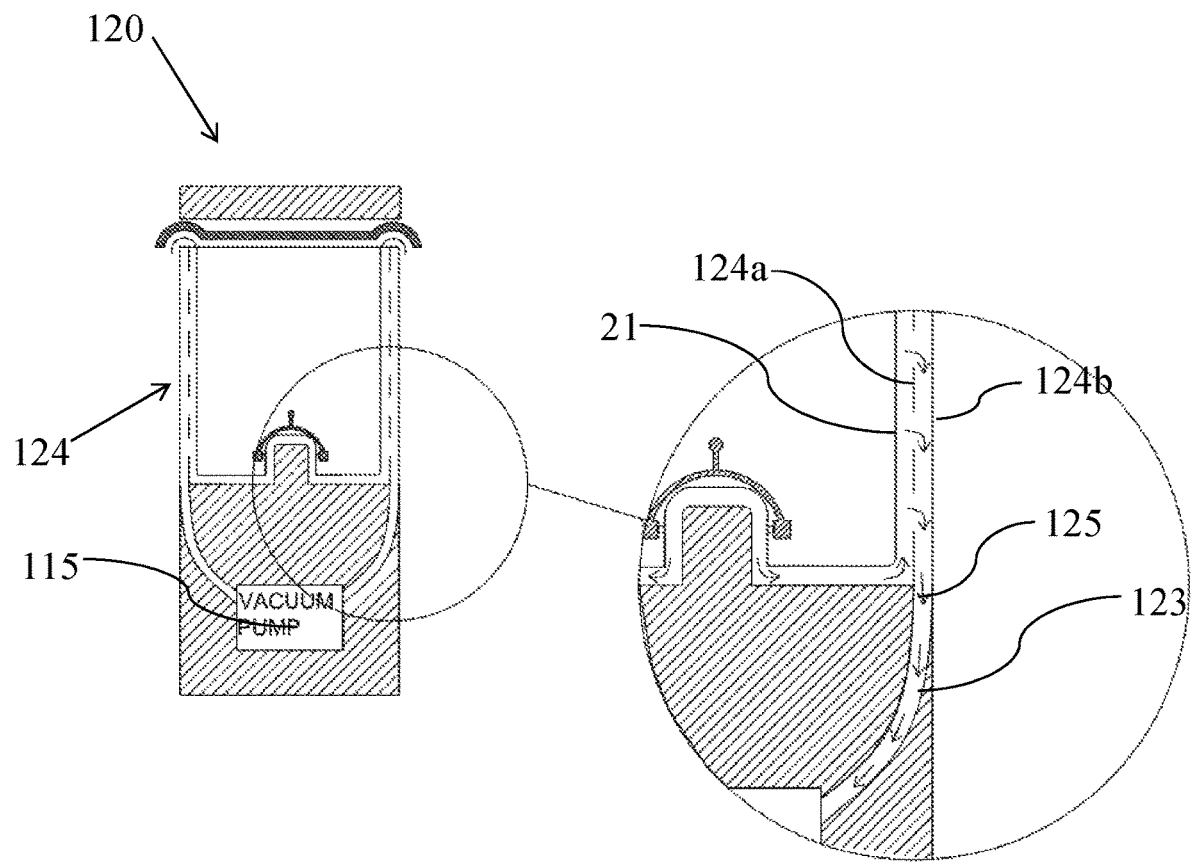

FIG. 12B schematically illustrates another embodiment in which a milk frother 120 comprises a vacuum system. The features of the vacuum system illustrated in FIG. 12A apply to the embodiment illustrated in FIG. 12B—namely, the double-walled container 124 comprises a perforated inner wall 124a and a whole outer wall 124b, when the whole outer wall 124b comprises at least one hole 125 connected to the pump conduit.

Figure 12C:
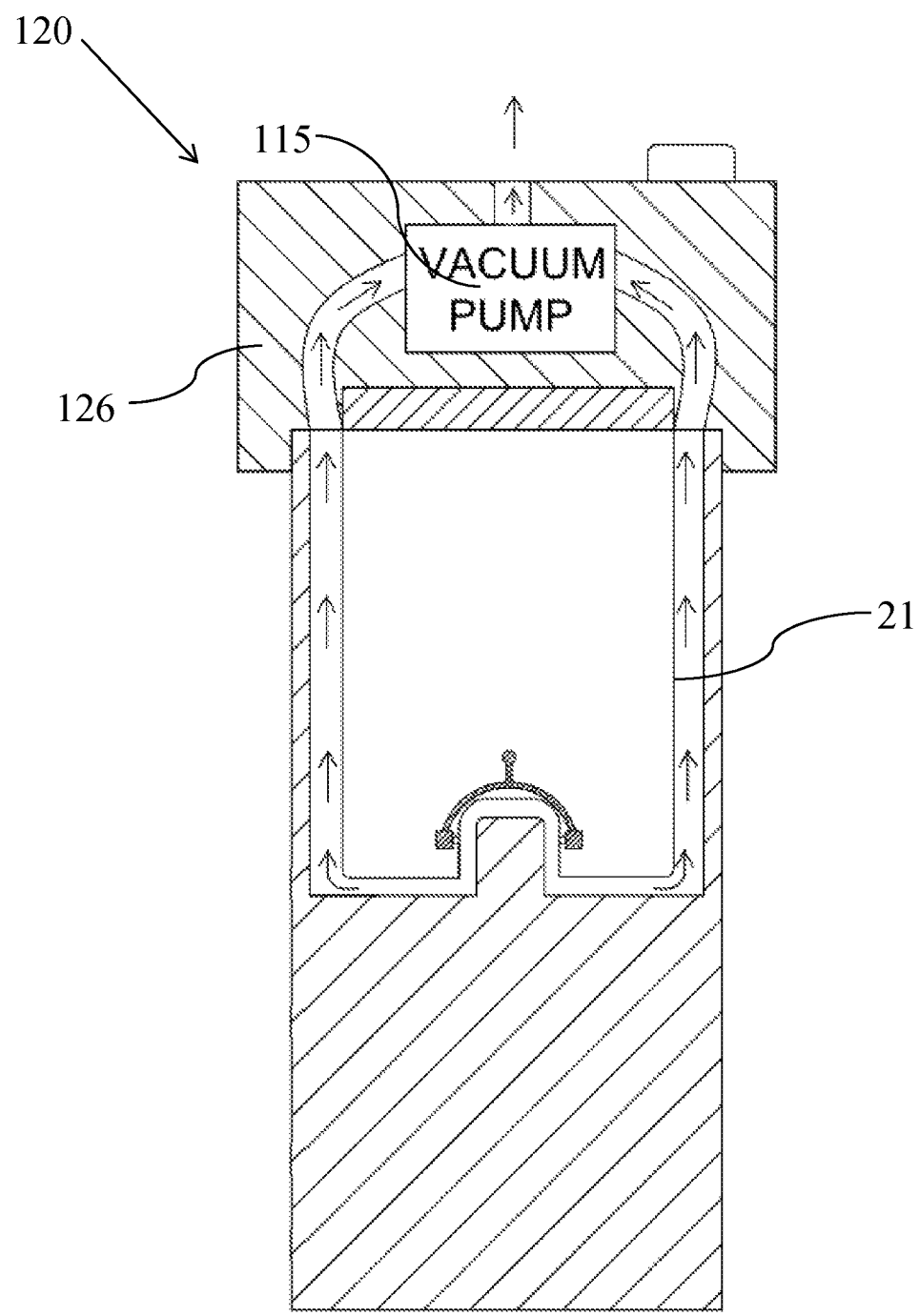

FIG. 12C schematically illustrates yet another embodiment in which a milk frother 120 comprises a vacuum system. The features of the vacuum system described previously apply to the embodiment illustrated in FIG. 12C, except that the internal vacuum pump 115 is positioned at the cover 126 of the milk frother 120.

According to alternative embodiments of the invention, the milk frother 120 fitted with an internal vacuum system comprises a combination of features illustrated in FIGS. 12A and 12B. According to this embodiment, the double-walled container comprises at least one hole, which is configured to be in direct contact with an end of at least one vacuum conduit, in fluid connection with an internal vacuum pump. In addition, the double-walled container comprises a perforated inner wall and a whole outer wall, when the whole outer wall comprises at least one hole, which is configured to be in direct contact with an end of at least one vacuum conduit, which is in fluid connection with an internal vacuum pump. This embodiment allows an efficient sucking of air entrapped between the shield and the working surface of the container, thus allowing a more tight attachment between them.

According to yet a further embodiment, the milk frother is fitted with a vacuum system and comprises the combination of features illustrated in FIGS. 12B and 12C. According to this embodiment, the internal vacuum pump is located in the cover of the milk frother, and air entrapped between the shield 21 and the working surface of the container is withdrawn through a vacuum conduit which is in fluid connection with the space between shield 21 and the working surface of the container with the internal vacuum pump positioned at the cover of the milk frother. In addition, the double-walled container comprises a perforated inner wall and a whole outer wall, when the whole outer wall comprises at least one hole, which is configured to be in direct contact with an end of at least one vacuum conduit, in fluid connection to the internal vacuum pump positioned at the cover of the milk frother. This embodiment also allows an efficient sucking of air entrapped between the shield and the working surface of the double-walled container, thus allowing a more tight attachment between them.

Figure 13A:
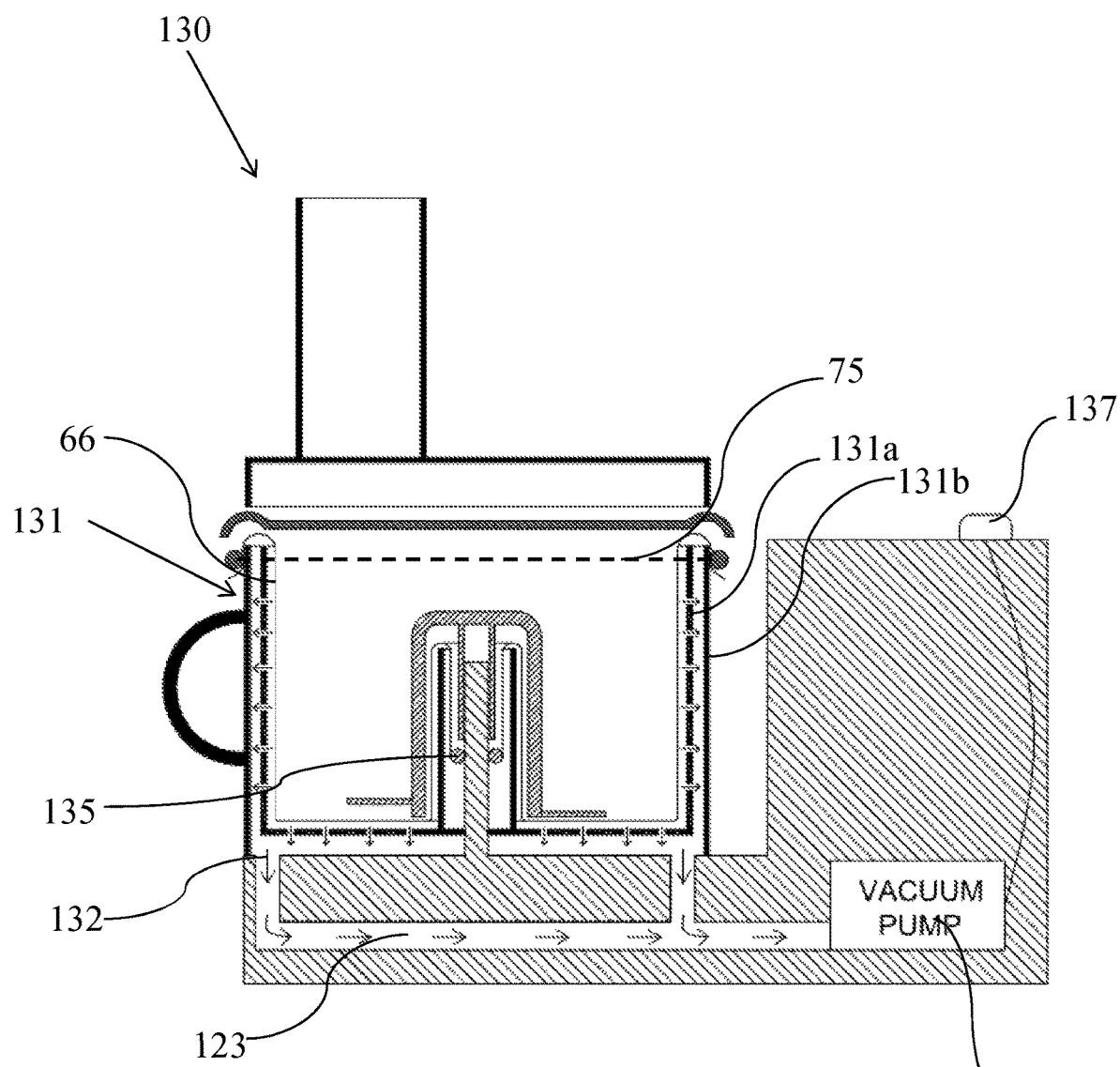
FIGS. 13A-13C show three different ways of providing reduced pressure in apparatus comprising a food processor, according to different embodiments of the present invention.

FIG. 13A schematically illustrates, a food processor 130 comprising a vacuum system. The features of the vacuum system described previously apply to the embodiment illustrated in FIG. 13A. According to this embodiment, the double-walled container 131 of the food processor 130 comprises a perforated inner wall 131a and a whole outer wall 131b, and the whole outer wall 131b comprises at least one hole 132 as described previously. According to one embodiment of the invention, an elastic band 75 is provided, which attaches the flexible margin of shield 66 to the edge of the double-walled container 131. In addition, O-ring 135 (or an alternative mechanical barrier) is used and, together with elastic band 75, facilitates the creation of reduced pressure between the shield 66 and the working surface of the double-walled container 131. A vacuum conduit 123 is in fluid connection with the internal vacuum pump 115.

Figure 13B:
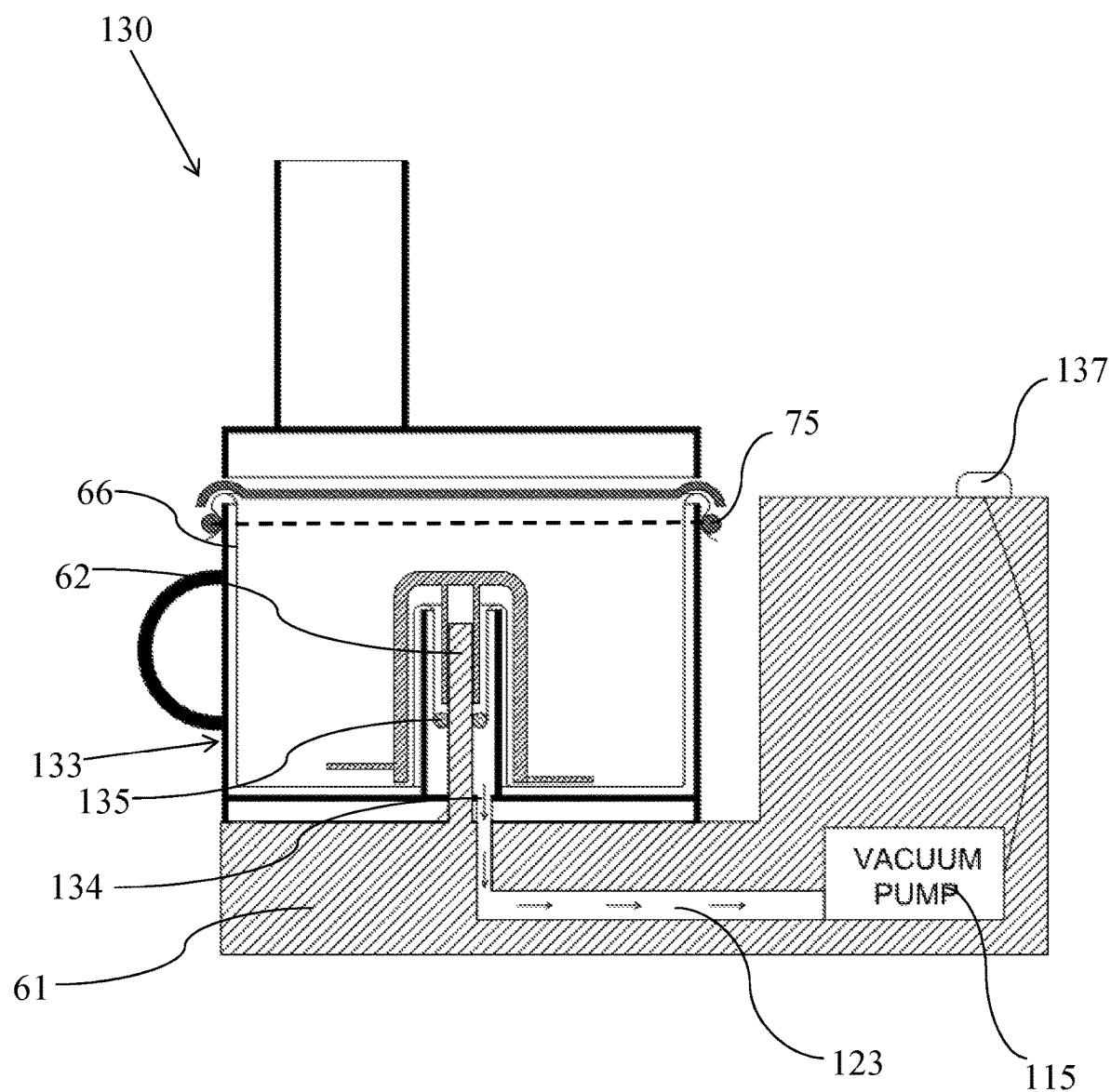

FIG. 13B schematically illustrates a food processor 130 comprising a vacuum system. The features of the vacuum system described above apply also to the embodiment illustrated in FIG. 13A, except that the container 133 of the food processor 130 comprises a hole 134 located at the vicinity of a motor shaft 62 of the food processor 130, and the base 61 of the food processor 130, on which the container 133 is placed, comprises a connector (not shown) which connects the hole 134 of the container 133 and an end of a vacuum conduit 123, which is in fluid connection with the internal vacuum pump 115. Thus, upon actuation of the internal vacuum pump 115, air entrapped between shield 66 and the working surface of the container 133 is withdrawn, thus allowing a tight attachment between them. Furthermore, also according to this embodiment, an elastic band 75 and an O-ring 135 (or an alternative mechanical barrier) are used to facilitate the creation of vacuum between the shield 66 and the working surface of the container 133.

Figure 13C:
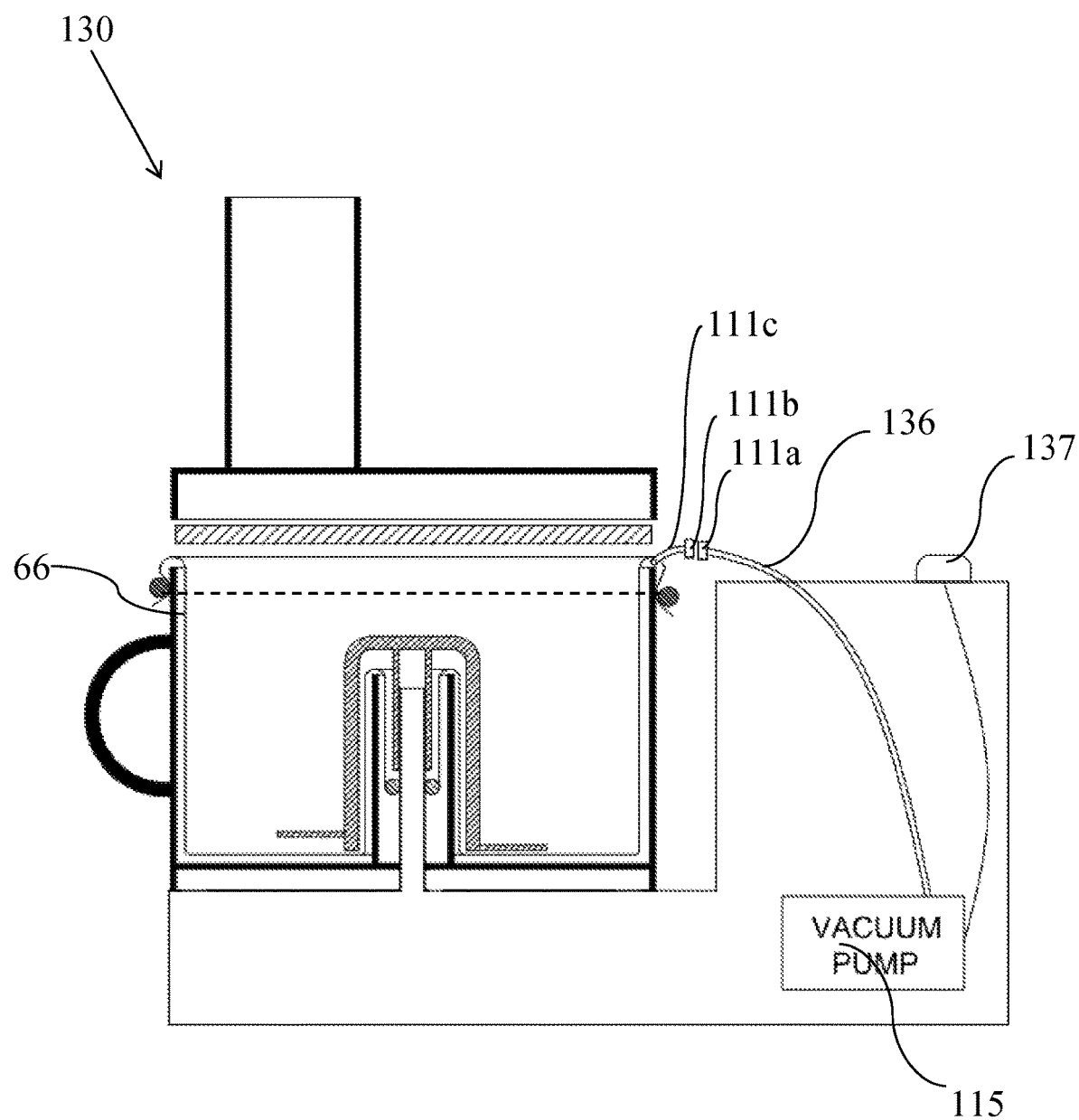

FIG. 13C schematically illustrates, a food processor 130 comprising a vacuum system. In this embodiment a flexible external vacuum conduit 136 is connected to an internal vacuum pump 115 at one end, and comprises a vacuum conduit connector 111a at the other end. In addition, the shield 66 comprises a suction tube 111c that comprises a suction tube connector 111b at the other end. The suction tube connector 111b connects with the vacuum conduit connector 111a. Upon actuation of the internal vacuum pump 115, air entrapped between shield 66 and the working surface of the container 137 is withdrawn, thus allowing a tight attachment between them.

According to one embodiment, there is provided a switch 137 electrically connected to the internal vacuum pump 115. The switch 137 is configured to be used by user to actuate and/or turn-off the internal vacuum pump 115. This allows operation of the internal vacuum pump 115 independently of the operation of the food processor 130. According to another embodiment, the internal vacuum pump 115 is electrically connected to an actuating mechanism of the food processor 130. Thus, the internal vacuum pump 115 is actuated when the food processor 130 is actuated.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable combination. Although the invention has been described in conjunction with specific embodiments thereof, it is evident that many alternatives, modifications and variations will be apparent to those skilled in the art without exceeding the scope of the invention, as defined in the appended claims.

The invention claimed is:

1. A device for processing of liquids and/or solids having a working surface and at least one moving element configured to operate adjacently to said working surface, and comprising a disposable layer adapted to shield said working surface from coming into direct/unmediated contact with the processed liquids and/or solids and the at least one moving element, and apparatus configured to apply a negative pressure in a gap between said disposable layer and said working surface at least during the entire operation of the at least one moving element, so as to cause said disposable layer to removably adhere to said working surface; the moveable element is configured to operate so adjacently to said working surface such that it would cause the disposable layer to be detached from the working surface during the operation thereof if no negative pressure were applied.

2. The device according to claim 1, wherein the disposable layer is made of elastic material.

3. The device according to claim 1, wherein the disposable layer comprises one or more materials selected from aluminum foil, polymers, a combination of an elastic material and a non-elastic material, or a combination of metals and plastics or polymers.

4. The device according to claim 1, wherein the moving element is a whisk.

5. The device according to claim 1, wherein the moving element comprises rotating blades; wherein said disposable layer comprises a recess corresponding to a motor shaft.

6. The device according to claim 1, wherein the moving element comprises a dough beater.

7. The device according to claim 1, wherein the apparatus suitable configured to apply a negative pressure comprises a vacuum pump.

8. A shielding aid for use with a device for processing of liquids and/or solids having a working surface and at least one moving element configured to operate adjacently to said working surface, said shielding aid consisting of a disposable layer adapted to fit the internal dimensions of a working surface and shield said working surface from coming into contact with a liquid and/or a solid that is processed in said liquid and/or solid processing device, and from unmediated contact with said at least one moving element thereof, said shielding aid being configured to removably adhere to the working surface of said device when a negative pressure is applied in a gap between said shielding aid and said working surface, at least during the entire operation of the at least one moving element, characterized in that the shielding aid is configured to withstand sufficient negative pressure such that the at least one moving element is enabled to operate adjacently to the working surface that would cause the disposable layer to be detached from the working surface if no negative pressure were applied.

9. The shielding aid according to claim 8, wherein the disposable layer is made of elastic material.

10. The shielding aid according to claim 8, wherein the disposable layer comprises aluminum foil.

11. The shielding aid according to claim 8 wherein the disposable layer comprises in combination metals and plastics or polymers.

12. The shielding aid according to claim 8, wherein the disposable layer comprises a polymer.

13. The shielding aid according to claim 8, wherein the disposable layer comprises in combination an elastic material and a non-elastic material.

14. The shielding aid according to claim 8, further comprising one or more sealing element(s).

15. The shielding aid according to claim 14, wherein the one or more sealing element comprises an integral or added elastic band.

16. The shielding aid according to claim 14, wherein the one or more sealing element comprises an O-ring.

17. A device comprising:
   (a) a source configured to apply negative pressure in a gap between a disposable layer and a working surface having sidewalls of said device; and
   (b) a moving element configured to operate adjacently to said sidewalls of said working surface selected from a group consisting of a whisk, rotating blades and a dough beater;
   wherein the source is configured to apply said negative pressure throughout the entire operation of the moving element, and configured to apply the pressure such that a shielding aid removably adhered to at least said sidewalls of said working surface will withstand adjacent operation of the moving element that would cause the disposable layer to be detached from the sidewalls of said working surface if no negative pressure were applied.

18. A disposable layer configured for use with a device according to claim 17, said disposable layer comprising a recess corresponding to a motor shaft configured to sealingly receive said at least one moving element of said device.

* * * * *